US 6,714,196 B2

(12) United States Patent
McCormack et al.

(10) Patent No.: US 6,714,196 B2
(45) Date of Patent: Mar. 30, 2004

(54) METHOD AND APPARATUS FOR TILED POLYGON TRAVERSAL

(75) Inventors: Joel James McCormack, Boulder, CO (US); Robert Stephen McNamara, Portola Valley, CA (US); Laura Edwards Mendyke, Calabasas, CA (US); Todd Aldridge Dutton, Southborough, MA (US)

(73) Assignee: Hewlett-Packard Development Company L.P, Houston, TX (US)

( * ) Notice: Subject to any disclaimer, the term of this patent is extended or adjusted under 35 U.S.C. 154(b) by 380 days.

(21) Appl. No.: 09/934,236

(22) Filed: Aug. 20, 2001

(65) Prior Publication Data

US 2002/0085010 A1 Jul. 4, 2002

Related U.S. Application Data

(60) Provisional application No. 60/226,495, filed on Aug. 18, 2000.

(51) Int. Cl.[7] ............................................... G06T 15/00
(52) U.S. Cl. ...................... 345/423; 345/419; 345/614; 345/622
(58) Field of Search ............................... 345/501, 419, 345/421, 423, 588, 614, 622; 711/201, 217, 218; 382/193, 194

(56) References Cited

U.S. PATENT DOCUMENTS 5,754,191 A * 5/1998 Mills et al. .................. 345/563
6,462,761 B1 * 10/2002 Hasuo ......................... 345/838
6,545,684 B1 * 4/2003 Dragony et al. ............. 345/531
6,552,723 B1 * 4/2003 Duluk, Jr. et al. ........... 345/419

OTHER PUBLICATIONS

M. White et al disclosed: Workstation Graphics Rendering Hardware (IEEE).*

* cited by examiner

Primary Examiner—Matthew C. Bella
Assistant Examiner—Mackly Monestime

(57) ABSTRACT

A method and apparatus for visiting all stamps that are relevant to a two-dimensional convex polygonal object. The object is visited with a rectangular stamp, which contains one or more discrete sample points. A relevant location is one for which the object contains at least one of the stamp's sample points when the stamp is placed at that location. Stamp locations are discrete points that are separated vertically by the stamp's height, and horizontally by the stamp's width. The stamp may move to a nearby position, or to a previously saved position, as it traverses the object. The plane in which the object lies is partitioned into rectangular tiles, which are at least as wide and high as the stamp. The invention visits stamp locations in an order that respects tile boundaries—that is, it visits all locations within one tile before visiting any locations within another tile. The invention may also be used with further partitioning of the plane (metatiles), so that it will visit all locations within a metatile before visiting any locations within another metatile, and further visit all locations within a portion of a tile within the current metatile before visiting any locations within a portion of a different tile within the current metatile.

64 Claims, 10 Drawing Sheets

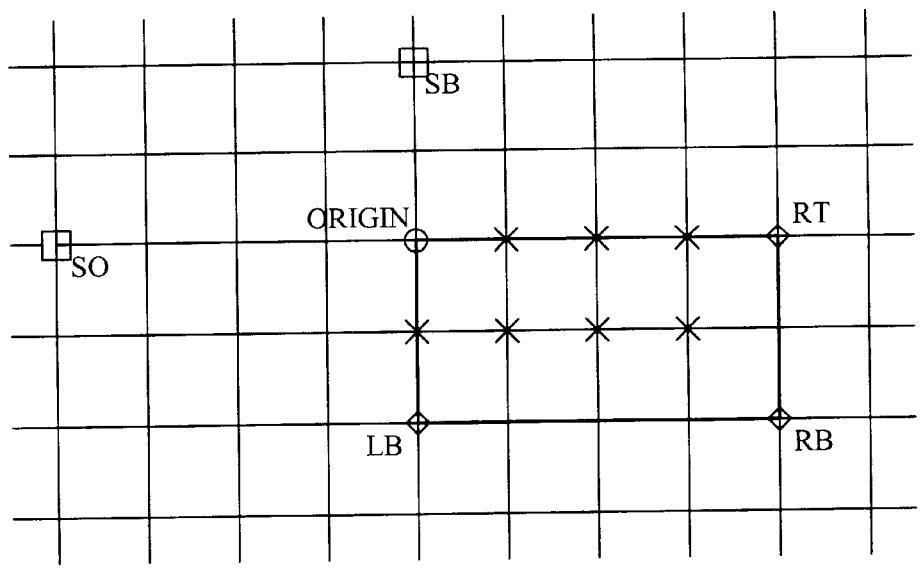

Figure 15

| Edge context |
|---|
| Edge 0 function value |
| Edge 1 function value |
| Edge 2 function value |
| Edge 3 function value |
| Valid position |
| Sliver position |

Figure 16

| Channel context |
|---|
| Red value |
| Green value |
| Blue value |
| Alpha tranparency value |
| Z depth value |
| Fog value |
| Texture coordinate u value |
| Texture coordinate v value |
| Texture coordinate w3 value |
| Texture coordinate q value |
| Texture derivative du/dx value |
| Texture derivative dv/dx value |
| Texture derivative du/dy value |
| Texture derivative dv/dy value |
| X coordinate value |
| Y coordinate value |

Figure 17

METHOD AND APPARATUS FOR TILED POLYGON TRAVERSAL

This application claims priority on U.S. provisional patent application No. 60/226,495, filed Aug. 18, 2000.

This invention relates generally to graphics accelerators, and more particularly to graphics accelerators that use half-plane edge functions to determine whether a given (x, y) position of a pixel is within a graphic object such as a line or triangle while rendering the object.

BACKGROUND OF THE INVENTION

Fragment Containment

A three-dimensional (3D) graphic processing device uses a description of an object such as a polygon, line, or triangle to generate the object's constituent fragments. A fragment is defined as all information required to render a single pixel that is within the boundaries of the object, for example, the x and y coordinates of the pixel, the red, green and blue color values used to modify the pixel, alpha transparency and Z depth values, texture coordinates, and the like. The graphics device must determine which fragments are contained within the object. Most prior art fragment generation methods fall into two categories: scanline and half-plane edge functions.

Scanline Generator

A scanline-based fragment generator renders trapezoids on a graphics rendering surface of an output device, such as a printer page or a display terminal screen. Without loss of generality, here a scanline is considered to be a (horizontal) row of pixels, and the top and bottom edges of the trapezoid are horizontal. Note that some fragment generators consider a scanline to be a (vertical) column of pixels and the right and left edges of the trapezoid are vertical.

The scanline fragment generator determines the inverse of the slope of the left and right edges of the trapezoid in order to determine how many pixels the left and right edges move horizontally when moving from one scanline to the next. At each scanline, the generator uses the inverse slope information to determine a starting pixel address and either a length or ending pixel address. This information is used to generate corresponding fragment information for each pixel position on the scanline within the object.

To render a non-trapezoidal object, such as an arbitrary triangle, the generator, in effect, renders two trapezoids while sharing some computation between the two. The generator first determines the inverse of the slope of all three edges of the triangle. The generator then vertically partitions the triangle into a top portion and a bottom portion, the point for partitioning being they coordinate of the vertex that is between the top and bottom of the triangle.

The two portions are degenerate trapezoids. The top portion has a top edge with a length of zero; the bottom portion has a bottom edge with a length of zero. The fragments for the top trapezoid can then be generated, and one of the inverse slopes used to generate the top portion can later be used to generate fragments for the bottom trapezoid portion.

Half-plane Edge Fragment Generator

A half-plane edge function fragment generator uses planar (affine) edge functions of the x and y screen coordinates. The values of these edge functions at a given pixel determine directly if the pixel is inside or outside an object. As an advantage, the generator does not need to determine the inverse slopes of the edges of the objects. However, traversal of the object is less intuitive than with a scanline generator. Given the value of the edge functions at various points surrounding the current position, the generator decides where to go next.

An introduction to half-plane edge functions is given by J. Pineda in "A Parallel Algorithm for Polygon Rasterization," ACM Computer Graphics, Volume 22, Number 4, August 1988 (SIGGRAPH 1988 issue), which is hereby incorporated by reference as background information, though the basic traversals methods described by Pineda are less than optimal.

As a very brief summary, each directed edge of an object, such as a triangle with three edges or a line with four edges, is represented as function that partitions the 2D (x, y) rendering plane into two portions: at points to the left of the parting edge with respect to its direction, the function is negative, and at points on the parting edge or to the right of the parting edge the function is nonnegative, that is, zero, or positive.

By combining information from all edge functions at a given point, it can be determined whether the point is inside or outside the object. For example, if the three directed edges of a triangle connect in a clockwise fashion, then a point is inside the triangle if all three edge functions are nonnegative. If the three edges connect in a counterclockwise fashion, then a point is inside the triangle if all three edge functions are negative. Note that points along an edge or vertex that is shared between two or more objects should be assigned to exactly one object. The edge equations can be adjusted during setup to accomplish this.

FIG. 2 shows a triangle 200 that can be described by three clockwise directed edges 201–203, which are shown as bold arrows. The half-plane where each corresponding edge function is nonnegative is shown by the several thin "shadow" lines 210. The shadow lines 210 have the same slope as the corresponding edge. The shaded portion of FIG. 2 shows the area where all edge functions are nonnegative, i.e., points within the triangle object 200.

Fragment Stamp

One advantage of using half-plane edge functions is that parallel fragment generation is possible. For example, one can define a "fragment stamp" as a $2^m$ pixel wide by $2^n$ pixel high rectangle, and simultaneously determine all fragments that are within both the fragment stamp and the object.

Most known half-plane based fragment generators first move the stamp horizontally left, and then horizontally right across a row "stampline" before stepping up or down somewhere into the next stampline. A stampline is similar to a scanline, except that a row stampline has a height equal to the height (i.e., the vertical extent of the stamp, as measured in units of pixels) of the fragment stamp. Alternatively, the stamp can be moved vertically up and down in a column stampline, followed by stepping horizontally into the next column stampline. In this alternative, the column stampline has a width equal to the width of the fragment stamp.

Although Pineda does not describe stamp movement in any great detail, his most efficient implementation implies a method that starts at a vertex that lies on one of the four edges of a minimal horizontally and vertically aligned rectangular bounding box that encloses the object.

Stamp Contexts

The best Pineda traversal method requires at least two stamp contexts. A stamp context is all the information needed to place the stamp at a given position within the object. The context information includes the x and y position of the stamp, the value of all four half-plane edge evaluators, as well as the value of all channel data being interpolated from values provided at the object's vertices. The channel data includes, for example, color, transparency, Z depth, and texture coordinates.

Unfortunately, the Pineda implementation frequently allows the stamp to move outside of the object. This means that the stamp has to somehow find its way back into the object. This increases the amount of time taken to traverse the object completely.

One way to fix this straying problem is to start at a vertex of the triangle that is at one corner of the minimal bounding box. However, usually no vertex of a wide line or an antialiased line will be in the corner of the bounding box, so this solution is of limited usefulness. A more general solution, which works for "four-sided lines" as well as three-sided triangles, adds a third stamp context. If no restrictions are placed upon the starting vertex, then four stamp contexts are required.

Typically, it takes approximately 600 bits or more to store a stamp context. With so many bits, the amount of chip "real estate" required to store stamp contexts becomes significant. Furthermore, as more contexts are used, the decision logic to compute and multiplex the next stamp position becomes more complex and slower. Because stamp movement computations cannot be pipelined, this decision and multiplexing logic may determine the minimum cycle time of the fragment generation logic. Thus, it is desirable that movement methods be implemented with a minimum number of such stamp contexts.

Prior Art Traversal Order

Regardless of the number of contexts used, the stamp movement methods implied by Pineda, and other known scanline fragment generators, traverse an object in a similar manner. They generate all fragments on a stampline, and then proceed to the next stampline.

Consequently, none of these approaches generate fragments in an order that is most efficient for a frame buffer constructed from typical dynamic RAM (DRAM, VRAM, SDRAM, SGRAM, FBRAM, etc.) used in graphics processors. This is true for the following reasons.

Physical Memory Page Crossing Overhead

Dynamic RAM is partitioned into pages. A dynamic RAM offers one or more banks. Each bank acts as a cache line in a direct-mapped cache for the pages. That is, each page in the RAM is associated with exactly one of the banks. The RAM offers very fast access to a page that is already loaded into its corresponding bank.

However, to access a page which is not already loaded into its corresponding bank, the bank must be written back to the page from which it was loaded ("precharged"), and the new page must be loaded into the bank ("row activated"). The precharge and row activate operations typically take three to eight times longer than accessing data already loaded into the bank. The combination of precharge and row activate operations is hereafter referred to as "page crossing overhead."

Reducing Page Crossing Overhead

To alleviate this overhead, some modern DRAMs (e.g. SDRAM, RAMBUS Direct RAM) allow precharge and row activate operations for one bank to be overlapped with data read or write operations in another bank. If precharge and row activate commands are issued sufficiently far in advance (the page is "prefetched"), then the page crossing overhead can be substantially reduced, or even completely hidden.

In order to reduce page crossing overhead, it is desirable to:

(1) arrange page dimensions so that most objects are stored in as few pages as possible, and (2) generate all the fragments for an object that reside in a given page before generating any fragments for a different page.

In order to satisfy (1), most graphics systems "tile" the rendering plane (screen or printer page) with DRAM pages that are as square as possible rather than linearly allocating screen pixels to pages. For example, rather than allocating a page that can hold 64-pixels as a strip that is 64 pixels wide by 1 pixel high, a graphics accelerator might allocate the page as a tile that is 8 pixels wide by 8 pixels high. On the average, this mapping of pixel locations into physical memory locations tends to group more fragments of an object onto a given page.

Mapping Pixel Locations to Memory Pages

FIGS. 3A–3D demonstrate this mapping. The thin lines 301 demarcate pixel boundaries, while the thick lines 302 demarcate page boundaries. The arrows 303 show the order in which fragments are generated, starting at the top-most scanline down through the bottom-most scanline. FIGS. 3A–3D show traversal orders for triangles 300 residing in one to four pages respectively.

One Page

In FIG. 3A, all pixels within the triangle lie on the same page, which substantially reduces page crossing overhead when compared to a linear assignment of pixels to pages. Unfortunately, when compared to a linear allocation, this technique can increase the page crossing overhead for some small triangles, and for nearly all large triangles, which must access two or more pages on each scanline in the widest parts of the triangle.

Two Pages

FIG. 3B shows such a situation in which fragment generation alternates between two pages of memory on the second, third, and fourth scanlines, requiring two page crossings on each such scanline. A one-bank DRAM would incur expensive page crossing overhead twice on these scanlines. A two-bank DRAM would be more forgiving, as most graphics accelerators "checkerboard" pages, so that pages that are horizontally or vertically adjacent lie in different banks. With such checkerboarding, the accelerator would access the two different pages in different banks.

Three Pages

For some objects, even a two-bank DRAM encounters problems. FIG. 3C shows a triangle that is stored in three pages. Two of the pages must use the same bank in a two-bank DRAM. For example, if the two banks are checkerboarded, the left-most and right-most pages reside in the same bank. Page crossing overhead occurs twice on each of the first three scanlines-once to fetch the left-most page into the bank, and once to fetch the right-most page into the bank.

Four Pages

FIG. 3D shows a triangle that is stored in four pages, two for each bank in a two-bank DRAM. The crossing from the top two banks to the bottom two banks may have insufficient work on the bottom scanline of each of the top pages to allow page crossing overhead to be completely hidden by prefetching. For example, if pages are checkerboarded, the top left and bottom right pages share bank A, and the top right and bottom left pages share bank B. The bottom right page cannot be fetched into bank A until all transactions in the top left page are completed. Even worse, the bottom left page cannot be fetched into bank B until all transactions in the top right page are completed. The page crossing overhead from the top right page to the bottom left page is fully exposed.

It would thus be desirable to be able to constrain the order of fragment generation so that all fragments of an object on each page are generated before any fragments on another page.

Checkerboarding

In order to maximize the possibility of hiding page crossing overhead by prefetching early enough, many graphics accelerators not only allocate each page to a rectangular region of the rendering plane, but as mentioned above, further allocate the rectangular regions such that a given page in one bank is in a different bank from the pages above, below, left, or right of it.

FIG. 4 shows this "checkerboarded" arrangement of pages where again thin lines 401 demarcate pixel boundaries, while the thick lines 402 demarcate page boundaries. Further, the shaded pages 403 belong to one bank, while the unshaded pages 404 belong to the other bank.

To take advantage of multiple bank DRAM, it is desirable that the fragment generator be aware of and exploit the bank arrangements, so that after all fragments on one page have been generated, the next page for which fragments are generated is in a different bank if possible.

Texture Cache Accesses

Furthermore, the efficiency of accesses to texture memory are directly influenced by the order in which fragments are generated. If the texture memory has a cache associated with it, then rendering large triangles may cause a sudden and large increase in texture cache capacity misses. This is because texture data fetched for a fragment on one stampline is ejected from the cache before the data can be reused for nearby fragments on an adjacent scanline.

Thus, it would be desirable to be able to constrain the order of fragment generation so that the capacity miss rate of the texture cache is reduced. That is, the rendering surface can be partitioned into rectangular tiles, where all positions within a tile should be visited before moving to another tile, and where the tile size is related to the texture cache size(s), the texture cache line size, and the hierarchical structure of the cache.

It is also desirable to maintain locality of reference in texture memory when moving from one tile to another. That is, when all positions in the object within one tile have been visited, it is desirable to move to a nearby tile rather than to a more distant tile.

Furthermore, while maintaining all the benefits of mapping tile dimensions to memory pages, it is desirable to simultaneously decrease the texture cache miss rate. Specifically, it would be desirable to visit all locations within a tile before visiting any positions in other tiles. Smaller tiles may be combined into a larger tile, a metatile overlaying smaller tiles. Thus, once all the locations in a tile are visited, the next tile visited should be within the metatile. When all of the tiles in a metatile have been visited, a different metatile is selected, and the process of visiting locations within a tile and then visiting other tiles within the metatile is repeated.

Tiling Prior Art

The paper "The Design and Analysis of a Cache Architecture for Texture Mapping," by Ziyad S. Hakura & Anoop Gupta, in *Proceedings of the 24th ISCA* (1997), describes how various performance results improve when fragments are generated in tiles. However, the details of how to accomplish such tiling are not described. Since this paper describes software simulation, it is likely that the tiling fragment generation is based upon a scanline generator. The high degree of parallelism in half-plane generators is a boon for hardware implementations but is usually a source of inefficiency for software implementations.

Microsoft's Talisman, see "Talisman: Commodity Real-time 3D Graphics for the PC," by Jay Torborg & James Kajiya, *in Proceedings of SIGGRAPH* 96, and an Apple chip described in "Hardware Accelerated Rendering of Antialiasing Using a Modified A-Buffer Algorithm", by Stephanie Winner et al. in *Proceedings of SIGGRAPH* 97, must process "blocks" of fragments, because these implementations do not include enough memory to hold all fragment information needed to render 3D graphics on a full rendering plane.

However, those implementations bear little resemblance to the graphics processor described here. They require that all fragments from different objects that lie within a particular portion of memory be generated before any fragments for a neighboring portion. Therefore, those implementations require that the graphics engine save up all objects in a scene, sort these objects, replicate the objects when an object has fragments in two or more portions of memory, then present all the objects in each portion to the fragment generator as a group, and then present all the objects (some duplicated) in the next block, etc. The fragment generator does not automatically move from block to block within an object, but is instead presented with the same object multiple times at perhaps widely separated intervals in time. Each time it is presented with a different block from a given object, it is either provided with a new starting point within the object, or it is given a "new" object, which is the original object clipped to the current block's boundaries.

Sorting and replicating graphic objects consumes system resources, as does computing a multiple starting points for an object or clipping an object to each block it overlaps. For some 3D application interfaces, such as OpenGL, which do not require one to present all objects in a frame before anything can be rendered, it is impossible to use these prior art techniques.

SUMMARY OF THE INVENTION

The present invention relates to a method and a computer system for visiting all stamp locations that are relevant to a two-dimensional convex polygonal object, such as might be encountered when rendering an object on a display device. The object is visited with a rectangular stamp, which contains one or more discrete sample points. A relevant location is one in which the object contains at least one of the stamp's sample points when the stamp is placed at that location. Stamp locations are discrete points that are separated vertically by the stamp's height, and horizontally by the stamp's width. The stamp may move to a nearby position, or to a previously saved position, as it traverses the object. The plane in which the object lies is partitioned into rectangular tiles, which are at least as wide and high as the stamp. The invention visits stamp locations in an order that respects tile boundaries—that is, it visits all locations within one tile before visiting any locations within another tile.

In terms of the method, the invention uses each pair of vertices, in the order presented, to construct a directed edge between the vertices. Each directed edge is represented by an affine function of the form E(x,y)=Ax+By+C, in which all points to the left of the edge have a negative value, all points on the edge have a zero value, and all points to the right of the edge have a positive value. Points are considered within the object if all edge functions are nonnegative for objects described by a series of clockwise vertices, or if all edge functions are negative for objects described by a series of counterclockwise vertices. Some edge functions are effectively infinitesimally displaced from their corresponding edge, so that edges that are shared between adjacent objects assign points directly on the edge to exactly one of the objects. The edge functions are evaluated at several points near the current position. Some nearby stamp positions are also checked to see if they are within the same tile or within a different tile. The sign bits of all edge functions are evaluated at several points, and the bits indicating if nearby stamp positions are in the same or a different tile are combined to determine if the next position of the stamp should be one of the nearby positions, if the next position should be fetched from a previously stored context, or if all locations within the object have been visited. These bits are also combined to determine which, if any, of the nearby locations should be stored into their corresponding contexts.

In one aspect of the invention, the first stamp position is near a vertex that lies on an edge of the unique minimal rectangular bounding box that contains the object and has two horizontal and two vertical edges. The invention uses up to six contexts, the current context as well as five saved contexts, to visit all locations within the object while respecting tile boundaries.

In another aspect of the invention, one of the five saved contexts shares physical storage space with two other saved contexts, and so while the invention conceptually uses a total of six contexts, it physically uses space for only five contexts.

In another aspect of the invention, a different polygon traversal process enables the invention to respect tile boundaries with only four contexts.

In another aspect of the invention, the traversal order from tile to tile occurs as much as possible in a serpentine manner. That is, when all locations in the object within one tile have been visited, the next tile visited is chosen to be close whenever possible.

In another aspect, tiles are partitioned into two or more disjoint sets. Tiles are arranged such that for any given tile belonging to one of the sets, each adjacent tile above, below, left and right of the tile belongs to a different set from the given tile's set. When tiles are partitioned into two sets, this results in a familiar checkerboard pattern of tiles. When all locations in the object within one tile have been visited, the next tile visited is chosen to be within a different set whenever possible.

In another aspect of the invention, the plane in which the object lies is partitioned into a second grid of tiles ("metatiles"), and the visitation order respects both tile and metatile boundaries. Each tile may be completely contained within a metatile; alternatively, the tile and metatile grids may be offset such that each tile is contained in several metatiles. The invention visits each location in the object respecting both tile and metatile boundaries, by visiting all locations in one metatile before visiting any locations within another metatile, and within each metatile by further visiting all locations within one tile before visiting any locations in another tile.

BRIEF DESCRIPTION OF THE DRAWINGS

An embodiment of the invention will be described with reference to the accompanying drawings, in which:

FIG. 15 depicts the positions for which edge function values are generated by the edge evaluators of the fragment generator;

FIG. 16 depicts an edge context data structure, which is generated by the fragment generator; and FIG. 17 depicts a channel context data structure, which is generated by the fragment generator.

DETAILED DESCRIPTION OF PREFERRED EMBODIMENTS

System Overview

Figure 1:
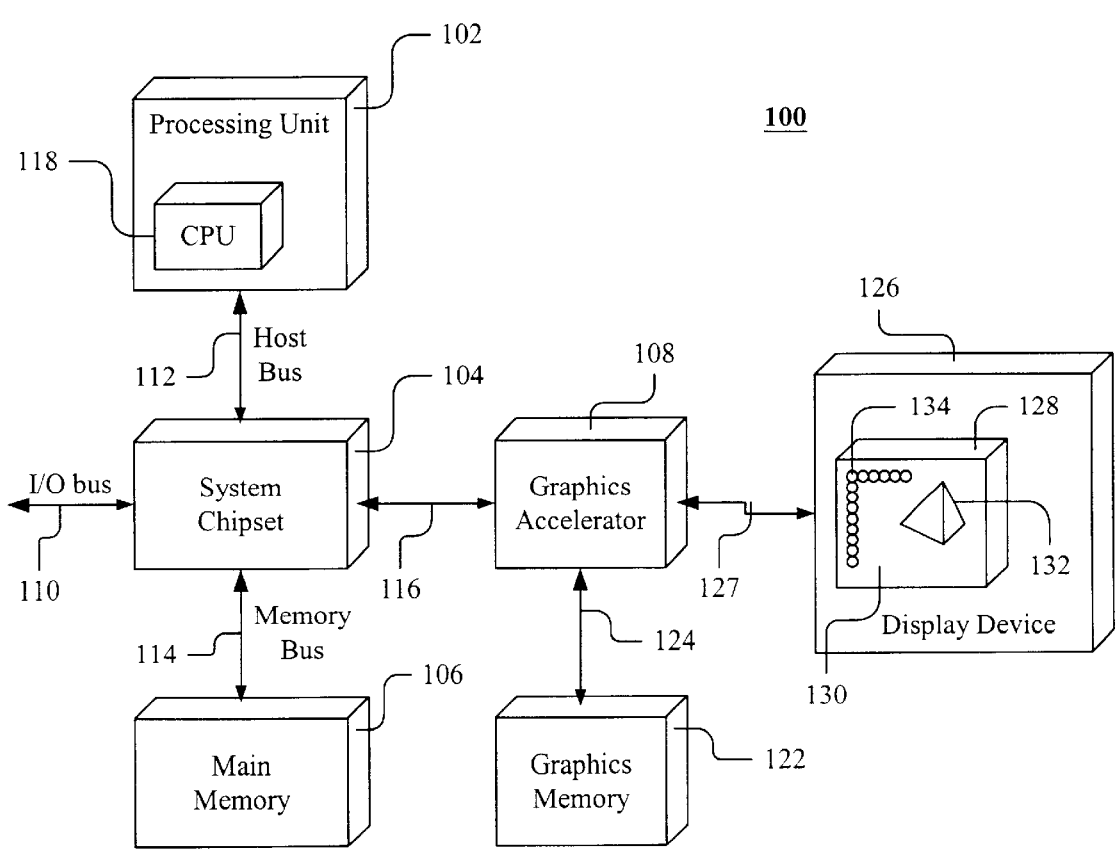
FIG. 1 is a block diagram of a graphics processing system that can use the tiled polygon traversal according to the invention.
Figure 2:
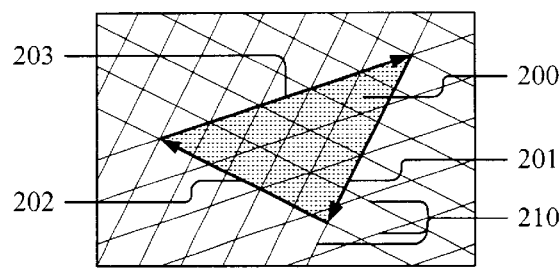
FIG. 2 is a diagram of a triangle with associated half-plane edges.
Figure 3A:
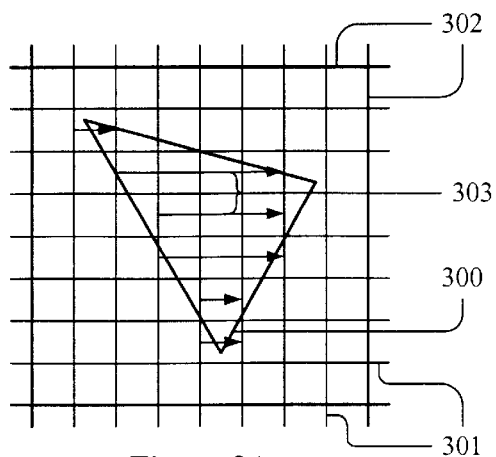
FIGS. 3A–3D shows a mapping of pixels to memory pages.
Figure 3B:
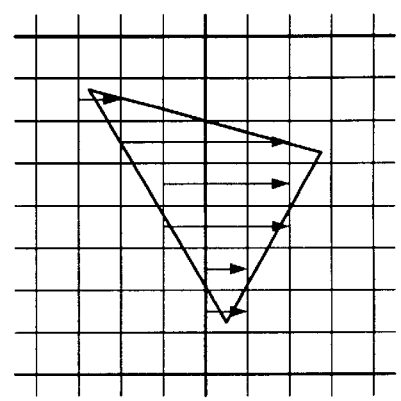
Figure 3C:
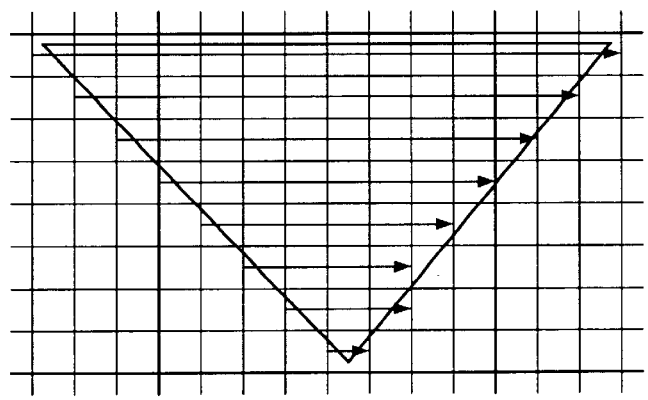
Figure 3D:
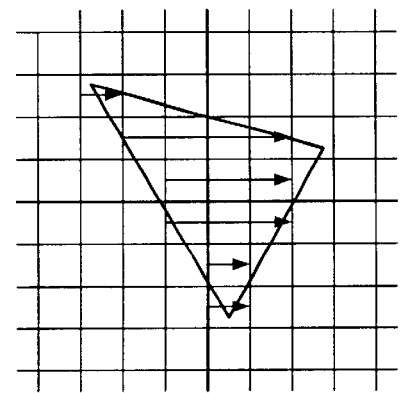

FIG. 1 shows a computer system 100 embodying the principles of the invention. The system 100 can generate monochrome or multicolor 2-D and 3-D graphic images for rendering on a display device. In the computer system 100, a system chip set 104 provides an interface among a processing unit 102, a main memory 106, a graphics accelerator 108, and devices (not shown) on an I/O bus 110. The processing unit 102 is coupled to the system chip set 104 by the host bus 112 and includes a central processing unit (CPU) 118. The main memory 106 interfaces to the system chip set 104 by bus 114.

The graphics accelerator 108 is coupled to the system chip set 104 by a bus 116, to a graphics memory 122 by a bus 124, and to a display device 126 by a bus 127. The display device 126 includes a raster display monitor 128 for rendering color images on, for example, a display surface or screen 130. The invention can also be practiced with a monochrome monitor that displays gray-scale images, with a printer that prints black and white or color images, or with any other pixel-based output device such as a liquid-crystal or dot matrix displays.

The rendering surface 130, for example, a display screen, includes a 2-D array of data elements called pixels and produces an image 132 by illuminating a particular pattern of those pixels 134. Conventionally, the pixels have (x,y) Cartesian coordinates. The image 132, for example, can be 2-D alphanumeric characters or a 3-D scene filled with objects.

The graphics memory 122 includes storage elements for storing an encoded version of the graphical image 132. There is a direct correspondence between the storage elements and the pixels 134 on the display screen 130. The values stored in the storage elements for a particular pixel, referred to as pixel data, control the intensity of the particular pixel 134 on the screen 130.

General Operation

During operation, the processing unit 102 can issue graphics commands requesting that a complex graphical object be rendered into an image 132. The processing unit first tessellates the graphical object into primitive objects such as triangles, lines, or quadrilaterals, or into lists of such primitives. Each primitive directly or indirectly specifies a convex polygon of three or more sides. The chip set 104 sends graphics commands specifying such primitives to the graphics accelerator 108, which executes the commands, converting the primitive objects into fragments.

A fragment is the information associated with a 2-D polygon created by clipping a convex polygonal primitive of the image 132 to the boundaries of a pixel. Fragment information includes the x and y coordinates of the pixel; in this description, x coordinates increase from left to right, and y coordinates increase from top to bottom. Fragments also include channel information that is interpolated from values provided at the primitive's vertices, such as the red, green, and blue color values of the primitive object at that location, alpha transparency, Z depth value, texture coordinates, and the like.

The graphics accelerator 108 merges or replaces existing pixel data with data from the fragments, and loads the pixel data corresponding to the fragments into the appropriate storage elements of the graphics memory 122.

Introduction

As stated above, an important operation during graphics rendering is to determine which fragments are contained within a convex polygonal object. The graphics accelerator initially positions a fragment stamp (i.e., a $2^m$ pixel wide by $2^n$ pixel high rectangle) so that it contains one vertex of the object. Typically, the stamp is aligned to an x and y position that is a multiple of the stamp's width and height, respectively, while the vertices are specified to subpixel precision. The initial position of the stamp is computed by setting the appropriate number of lower bits of the starting vertex's x and y coordinates to zero. Though the detailed methods below can start at any vertex on the edge of a minimal bounding box, for simplicity of description, each example in this document starts at the left-most vertex of the object.

At each position of the stamp, the graphics accelerator renders the portion of a graphic object that falls within the set of pixels covered by the stamp. For each pixel within the stamp that has at least one sample point contained within the object, one fragment is generated by the graphics accelerator. The fragment for a pixel represents the color, depth and other attributes of the graphic object at that pixel. In one preferred embodiment, the graphics accelerator simultaneously generates fragments for all of the N pixels within the stamp, while in other preferred embodiments, the graphics accelerator generates fragments for one pixel (within the stamp) at a time, or two pixels at a time, or more generally for less than all N pixels at a time.

Edge functions are evaluated at several points near the stamp, which yields information about which nearby stamp positions probably contain portions of the object (i.e., fall at least partially within the boundary of the object), which information is used to determine nearby stamp positions to be visited immediately or sometime later. For the various embodiments of the invention described herein, the nearby stamp positions considered are the "Manhattan" stamp positions, which are directly left, right, up, and down from the current position. It will become apparent that the methods described herein can be extended to consider diagonally adjacent stamp positions or even nonadjacent positions, in order to avoid visiting "unproductive" stamp positions that generate no fragments. However, the extra circuitry required for non-Manhattan movement may increase overall cycle time so much as to outweigh the small reduction in the number of moves used to traverse an object.

A nearby stamp position is valid if the traversal logic or process considers it a plausible candidate for visiting, and invalid if the position is not a candidate. Valid positions are those for which the $2^m \times 2^n$ pixel stamp probably contains a portion of the object. More complex implementations of the graphics accelerator 108 evaluate the edge functions at more points, and thus are able to classify some positions as slivers if the stamp rectangle contain a portion of the object, but nonetheless will not generate any fragments. This may occur if an object barely intrudes into a stamp position, and so doesn't contain any of the sample points in the stamp.

The valid nearby stamp positions are also determined to be in the same tile as the current position, or in a different tile. This knowledge is combined with the current state of the fragment generator in the graphics accelerator to move the stamp to another position within the same tile (if one exists) before moving to a position within a different tile. Movement of the stamp can be either directly to a nearby position (e.g., adjacent to the current stamp position), or by restoring a previously saved stamp context. The method also determines what nearby positions (if any) should be saved to the corresponding stamp contexts.

Non-tiling Method

First, a non-tiling traversal method is described for the case where each stampline is a column of one or more pixels, equal to the width of the fragment stamp. This method uses three contexts: the current context, as well as a backSave and overSave context.

If the stamp position above the starting position is valid, then that position is saved in a backSave stamp context.

The method moves to all valid stamp positions below the starting position, then restores the backSave context and then visits all valid positions above the starting position. Restoring a context also empties the restored context (or, equivalently, invalidates the restored context); a new position must be stored in the context before it can be restored again. When a context is restored, it is copied into the current context.

As the stamp visits positions on the stampline, also examined are the positions on the column stampline immediately to the right of the current position. The first such valid position is saved in the overSave context.

When the stamp has finished visiting all positions on the current stampline, the stamp then moves right to the overSave position in the next stampline. That is, the graphics accelerator restores the overSave context by copying it into the current context and invalidating the overSave context. The graphics accelerator repeats the process of storing into backSave the valid position above the first position in the new stampline, visiting all the valid positions below, restoring the backSave context and visiting all the valid positions above, and then moving to the next stampline to the right by restoring the overSave context. When the stamp has no positions farther to the right to visit (i.e., when overSave is empty), the graphics accelerator is finished traversing the object.

Bypassing Saved Contexts

In this, and all other embodiments of the invention discussed below, bypassing is used to avoid the time required to save an adjacent stamp position, and then immediately load that saved context. For example, if the first stamp position in a stampline has no valid position to visit below, then for the next cycle the stamp immediately proceeds to the valid position above, rather than taking one cycle to save the above position in backSave, and another cycle to restore it from backSave into the current context.

Similarly, if the position to the right is valid and overSave is empty when all locations in a stampline have been visited, then the graphics accelerator immediately moves the stamp right to the next stampline rather than saving the position in overSave and then restoring that position on the next cycle.

As can be seen in the detailed descriptions, bypassing increases the complexity of the traversal logic and process. For clarity, the summaries of each method always refer to saving and restoring a context, even when the implementation actually bypasses the saved context for efficiency.

Example of Order of Traversal for a Non-tiling Method

Figure 5:
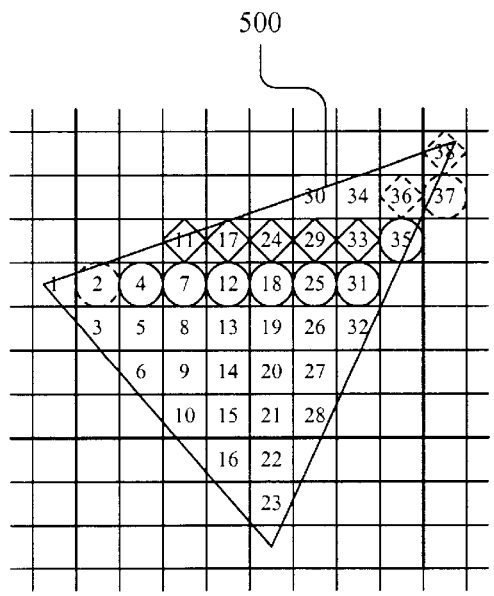
FIG. 5 is a diagram of a non-tiled traversal of a polygonal object.

FIG. 5 depicts the order in which this non-tiling method visits stamp positions inside an exemplary triangle 500. For simplicity, the fragment stamp in this example is a single pixel wide and high. It should be apparent that other stamp sizes ($2^m \times 2^n$ pixels) can be used. A pixel is considered to be inside the triangle when the center of the square representing the pixel is inside the triangle. That is, the stamp has a single sample point in its center. Each pixel inside the triangle has been labeled with a number showing the order in which pixels are visited.

Each back position above the first position on each stampline that was saved into backSave and then later restored is enclosed in a solid diamond. Each back position that was immediately bypassed directly into the current context is enclosed in a dashed diamond. Each over position to the right of the stampline that was saved into backSave and then later restored, or was immediately bypassed, is enclosed in a solid or dashed circle, respectively.

Page (tile) boundaries are shown with thick grid lines. Since the triangle spans four pages, a traversal method that respects page boundaries would cross pages three times. But note the six page crossings for the non-tiling method: from position 1 to 2, from 15 to 16, from 16 to 17, from 21 to 22, from 23 to 24, and from 36 to 37.

Inspection of this example reveals that the non-tiling process may benefit from identifying a valid position as a sliver position if the stamp contains a portion of the object, but the object does not contain any of the stamp's sample points (the pixel center in this 1×1 stamp example). Visiting sliver positions is often not necessary—since the object contains no sample points at that position, the stamp will generate no fragments. Note, however, that the stamp moves from position 36 to position 37, a pixel whose center is outside the object. This move is needed to get to position 38, which is in the object. This stepping outside the object temporarily is called "sliver following." In general, stamp traversal implementations in which slivers are not followed unless absolutely necessary are preferred. Use of sliver information is discussed more completely below.

A 6-Context Tiling Method

This method visits all locations within a tile before visiting a location in a new tile. Typically, a tile is $2^i$ pixels wide by $2^j$ pixels high. It uses six contexts: current, backSave, backTileSave, forwardTileSave, overSave, and overTileSave.

The tiling method moves vertically along a column stampline, much like the non-tiling method. However, if the current position is at the bottom of a tile, and the next position down is valid, then the stamp does not proceed further down the stampline. Instead, it saves the stamp position below in the context forwardTileSave if that context is empty, then proceeds to restore the backSave context. Similarly, if the current position is at the top of a tile, and the next position up is valid, then the stamp does not proceed further up the stampline. Instead, it saves the stamp position above in the context backTileSave if that context is empty, then proceeds to restore the overSave context. Additionally, if the current position is at the right edge of a tile, and the position to the right is valid, the position to the right is saved into overTileSave (if empty) rather than overSave.

When all locations within both the object and the first tile have been visited (the traversal logic or method attempts to restore overSave, but that context is empty), it proceeds to visit the tile below the current one, if the tile below contains a portion of the object, by restoring forwardTileSave. The traversal method inside this tile is much like that in the first tile, except that saves into backTileSave are not allowed. The traversal process similarly proceeds to visit all tiles in the tileline below the first tile. (A tileline is a column of tiles in all embodiments described herein.)

When all tiles in the tileline below the first tile have been visited (the traversal process attempts to restore forwardTileSave, but that context is empty), it then proceeds to visit all tiles which contain a portion of the object that are above the first tile. It restores backTileSave, and visits locations in each tile much like the first tile, except in this case saves into forwardTileSave are not allowed.

The entire tileline has been traversed when the traversal process attempts to restore backTileSave, but that context is empty. The graphics accelerator then moves the stamp to the next tileline to the right, by restoring overTileSave, and starts the visiting process anew: visiting all location in the object in the first tile, visiting all tiles below, and then visiting all tiles above.

The entire object has been traversed when an attempt is made to restore overTileSave, and that context is empty.

Example of Order of Traversal for the 6-Context Tiling Method

Figure 6:
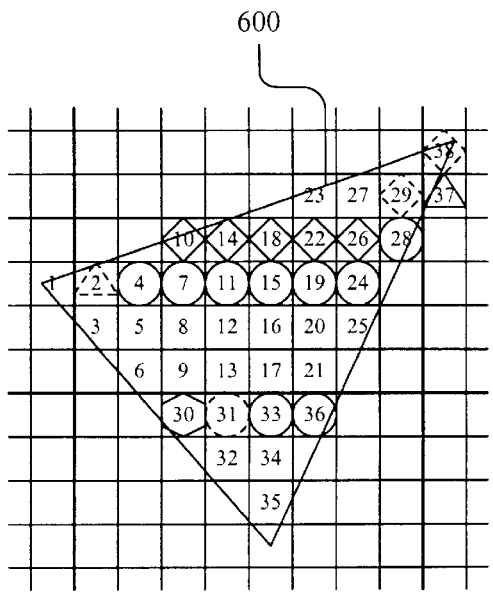
FIG. 6 is a diagram of a tiled traversal of a polygonal object.

The triangle 600 shown in FIG. 6 demonstrates the traversal order of this tiling method. As in FIG. 5, backSave positions are shown in diamonds, and overSave positions are shown in circles. Again, bypassed positions that would otherwise be saved are shown inside dashed versions of the non-bypassed indicators. The triangle is not high enough to require a backTileSave position. The forwardTileSave position is shown by the hexagon around position 30. The overTileSave positions are shown with small triangles around positions 2 and 37. Note the reduced number of page crossings for the tiling method with only three crossings in total: 1 to 2, 29 to 30, and 36 to 37.

A 5-Context Tiling Method

An alternative embodiment uses the same traversal order as the 6-context method, but exploits the fact that if backSave is non-empty, then either overSave or overTileSave is empty and remains empty until backSave is restored and thus emptied. This alternative stores backSave in whichever of these two other stamp contexts is empty at the time, and thus uses only five physical stamp contexts to store the six virtual stamp contexts used by this alternative embodiment.

A 4-Context Tiling Method

Another alternative embodiment rotates the order in which fragments are visited within a tile by 90 degrees, which reduces the number of stamp contexts required to four: current, forwardSave, backSave, and overTileSave. In this embodiment, again suppose that the method chooses the leftmost vertex of the object to begin.

Rather than visiting stamplines that are multiple columns of pixels, this method visits stamplines that are multiple rows of pixels. Tilelines, however, remain columns of tiles. This method can be divided into three phases.

Phase 0

Phase 0 visits all (row) stamplines within the object and first tile that are in the starting stampline or in stamplines below the starting stampline.

In phase 0, first visit all locations in the (row) stampline to the right of the starting position that are in the first tile of the tileline. While visiting each position in this stampline that is within the object and the tile, detect valid positions in the stamplines above and below, and save the first of each in backSave and forwardSave, respectively. These saved positions need not be in the same tile as the current position.

In all portions of all three phases, if the stamp position to the right is valid and in a different tile, and if overTileSave is empty, then save the position to the right in overTileSave.

After the initial stampline within the first tile is visited, the traversal process visits all other stamplines below that are also within the first tile. If the position below the current stampline that is saved in forwardSave is in a different tile, or if forwardSave is empty, then the method enters Phase 1 described below. Otherwise, restore the forwardSave position, and visit all locations within the object and the current tile in that stampline, while looking for the first valid positions below to store into forwardSave. Continue sweeping out stamplines farther below that are still within the tile by restoring forwardSave only if it is within the same tile.

Phase 1

Phase 1 visits all the stamplines that are above the starting position, and that are in the same tileline.

Restore backSave, which is somewhere in the stampline above the first stampline, and visit each position within the object and within the current tileline, saving a valid backSave position in the stampline above if one exists. At the right edge of the object or tile, restore backSave and visit the next stampline above, etc. Since this embodiment does not check for tile boundaries above when restoring backSave, after visiting the rest of the stamplines in the first tile, the method seamlessly proceeds to visit all locations in each tile above the starting tile. When it is not possible to move up to a new stampline anymore (backSave is empty), enter Phase 2.

Phase 2

Phase 2 visits all the (row) stamplines in the (column) tileline that are below the first tile visited.

Phase 2 is similar to the second portion of Phase 0, but doesn't pay attention to tile boundaries below when restoring forwardSave. It starts by restoring forwardSave, which is a topmost position in the tile below the original tile. Visit all locations on the stampline that are within the object and the tileline, saving the first valid position below in forwardSave. Continue restoring forwardSave, visiting the stampline below, and saving a new forwardSave.

If the forwardSave context cannot be restored because it is empty, the entire tileline has been traversed. In this case, the overTileSave position that is in the next (column) tileline to the right is restored. Return to Phase 0 to traverse this tileline. If overTileSave cannot be restored because it is empty, the object has been completely traversed.

Example of Order of Traversal for the 4-Context Tiling Method

Figure 7:
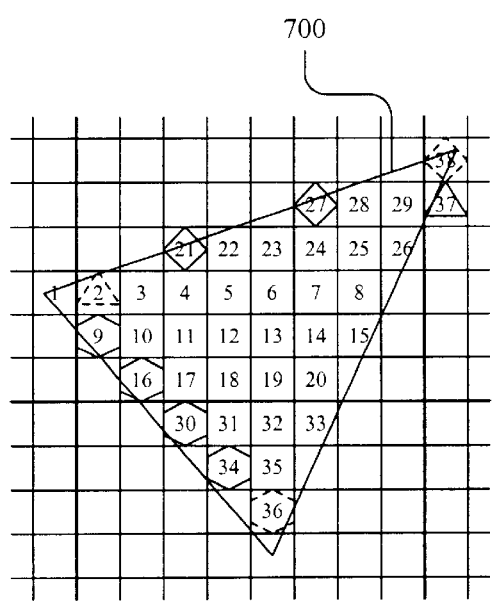
FIG. 7 is a diagram of a phased tiled traversal of a polygonal object.

The movement of this method is shown for the exemplary triangle 700 in FIG. 7. In this case the forwardSave positions are shown in hexagons, the backSave positions in diamonds, and the overTileSave positions in triangles. As usual, bypassed positions are enclosed in dashed lines.

Serpentine Traversals

The methods described thus far save the first valid position in a new tileline into the context overTileSave. This imposes a traversal order at the tile level which is not optimal for a frame buffer or for a texture cache. In particular, when traversing large objects that span many tiles, restoring overTileSave tends to jump to a tile that is distant from the current tile.

This behavior can be improved by imposing a serpentine traversal order on tiles, in which restoring overTileSave tends to jump to a tile that is nearby, or in the best case horizontally adjacent to, the current tile. This is accomplished by repeatedly overwriting overTileSave with the most recent valid position found in the next tileline to the right, and by swapping the order in which tiles are visited from one tileline to another. The traversal order of blocks then resembles a snake's movement, in the best case traveling up one tileline, down the next, up the next, etc., hence the name serpentine. In the worst case, the top and bottom edges of the object grow apart for some time, but serpentine behavior is still approximated: down one tileline then up the rest of the tileline, up a little bit in the next tileline then down the rest of the tileline, down a little bit the next tileline then up the rest, etc.

Figure 4:
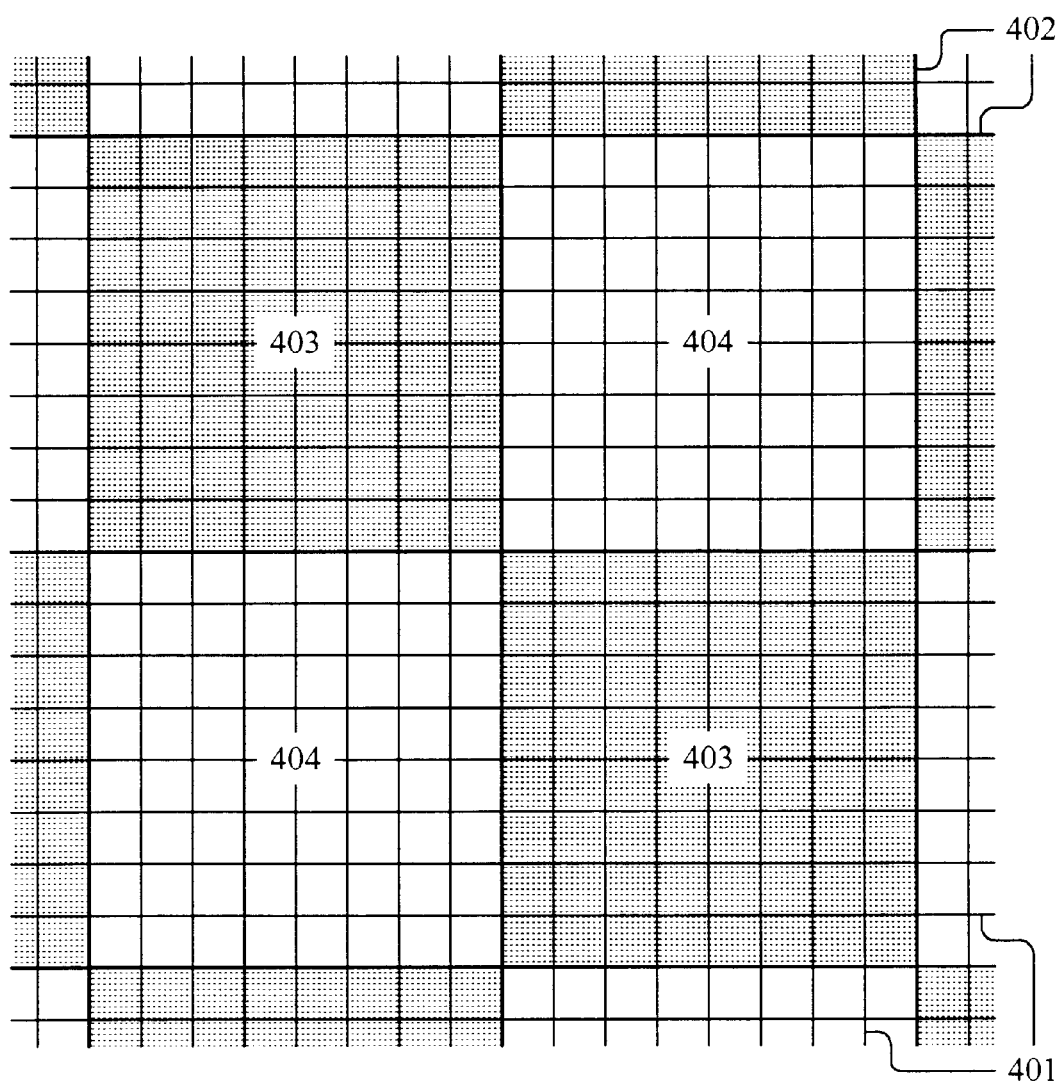
FIG. 4 is a diagram of memory pages assigned to banks in a checkerboard pattern.

When tiles are configured (i.e., sized) to match the DRAM page size (i.e., cache line size) of the frame buffer, serpentine traversal increases the odds that the move from the last position in a tileline to the first position in the next tileline will move horizontally or vertically to an adjacent tile. In a multibank DRAM that has been checkerboarded as in FIG. 4, this moves from one DRAM bank to a different DRAM bank. This in turn increases the odds that prefetching may be able to hide some or all of the page crossing overhead.

When tiles are configured (i.e., sized) to optimally reduce texture cache misses, serpentine traversal increases the locality of texture accesses when moving from one tileline to another. This in turn increases the odds that texture accesses will hit the texture cache, rather than miss and thus require a fetch from texture memory. This also increases the odds that if a texture cache miss must fetch data from texture memory, it will fetch data from a memory location that is on the same page as other recent texture cache misses, and so is still loaded from a memory bank that can be accessed quickly.

Determining the optimal tile size as a function of the texture cache size requires consideration of several other texture mapping factors. For example, for a given texture cache size, using 8-bit texels would either require (or make optimal) use of larger tiles than if 32-bit texels were used. Using trilinear interpolation instead of bilinear interpolation might require the use of smaller tiles. Using anisotropic texture mapping requires even smaller tiles. And because texture mapped surfaces can be at various distances from the viewer, and rotated and tilted as well, there is not an exact correspondence between the (x, y) position of textured pixels and the texture memory accesses required to texture them, as there is between the position of pixels and the frame buffer memory accesses required to update them. Thus, even using the same size texels and the same texture mapping mode, different surfaces will require different amounts of texture information for the same tile size. This makes it more difficult to choose the best tile size. As a result, determining the size of the tile based on the texture cache size, texel depth and texture mapping mode may also take into account statistical probabilities of various types of surfaces and the size of the cache lines within the texture cache.

This serpentine technique can be applied to any of the embodiments described above. However, due to the complexity that already exists in the 6-context version and its 5-context variant, the detailed traversal process description below does not include a full serpentine movement implementation. Although it saves the last valid position found in the next tileline into overTileSave, it does not reverse the traversal order of tiles from one tileline to another.

The detailed description of the traversal process for the 4-context invention, which is much simpler, includes the feature of optionally reversing the roles of forward and back each tileline. Serpentine traversal should be optionally enabled, as some operations, such as copying data from one place to another, may require a more restrictive traversal order to prevent prematurely overwriting old data that has not yet been read.

Adding Contexts to Reduce Page Crossings

As a further variant to all the above methods, another stamp context can be added so that two positions in the next tileline to the right can be saved: overTileSaveA for one set of banks, and overTileSaveB for a different set of banks. This further increases the odds that when it is time to move to a new position in the next tileline, the method can choose the position that is in a different bank from the current bank.

This solution does not eliminate a same-bank page crossing in all cases. Sometimes only one tile in the next tileline contains the object, and this tile is in the same bank as the last tile visited on the current tileline. In other cases, this technique successfully changes banks as it crosses from one tileline to another, but this then causes a page transition within the same bank to occur within the tileline when moving to backTileSave in the 6- and 5-context methods, or to forwardTileSave in Phase 2 of the 4-context method.

Managing Slivers

The methods described in detail below are a somewhat more complex than the summaries above, mainly due to additional steps or logic that are used to avoid "slivers." A "sliver" is a portion of an object that may pass through a stamp position, but in such a fashion that it is guaranteed not to generate any fragments at that position, because that portion of the object does not enclose any of the stamp's sample points.

In some such cases, the sliver stamp position must be visited in order to reach other stamp positions which may generate fragments. In other cases, the sliver stamp position need not be visited when, in the course of visiting other stamp locations, a better stamp position is found. A "better" position may itself be a sliver position that leads to a non-sliver position more quickly.

Avoiding slivers with a 2 pixel by 2 pixel stamp decreases the number of stamp positions visited for an object by about 10% for aliased drawing, where the stamp contains four sample points (one for each pixel). In such cases, it is quite likely that a stamp position will contain a portion of the object, but the object will not contain any of the four sample positions. Avoiding slivers decreases the number of stamp positions visited for an object by only about 1% for antialiased drawing, where each pixel has a 16×16 grid upon which 16 sample points are placed. Since the antialiased sample points are densely spread over each pixel, it is rare for the object to intersect a stamp position, yet not contain any of the stamp's 64 sample points (4 pixels×16 sample points=64 sample points).

Because it takes time to determine the sliver information and to process the information, it may be better for an antialiasing implementation of the graphics accelerator to avoid sliver handling, and perhaps reduce the time required to compute a new position. This reduction in processing time may lead to a reduced cycle time. Though it will occasionally visit a stamp position that could have been avoided via sliver processing, the reduced cycle time nonetheless may mean that less time overall is required to traverse objects.

So as yet another variant, all methods described in detail below can be slightly simplified by assuming that the sliver information is not determined; the variant methods are derivable from the described methods by simply setting the sliver inputs to a logical false value, and then simplifying the conditions that depend upon slivers.

Implementation Details

Figure 11:
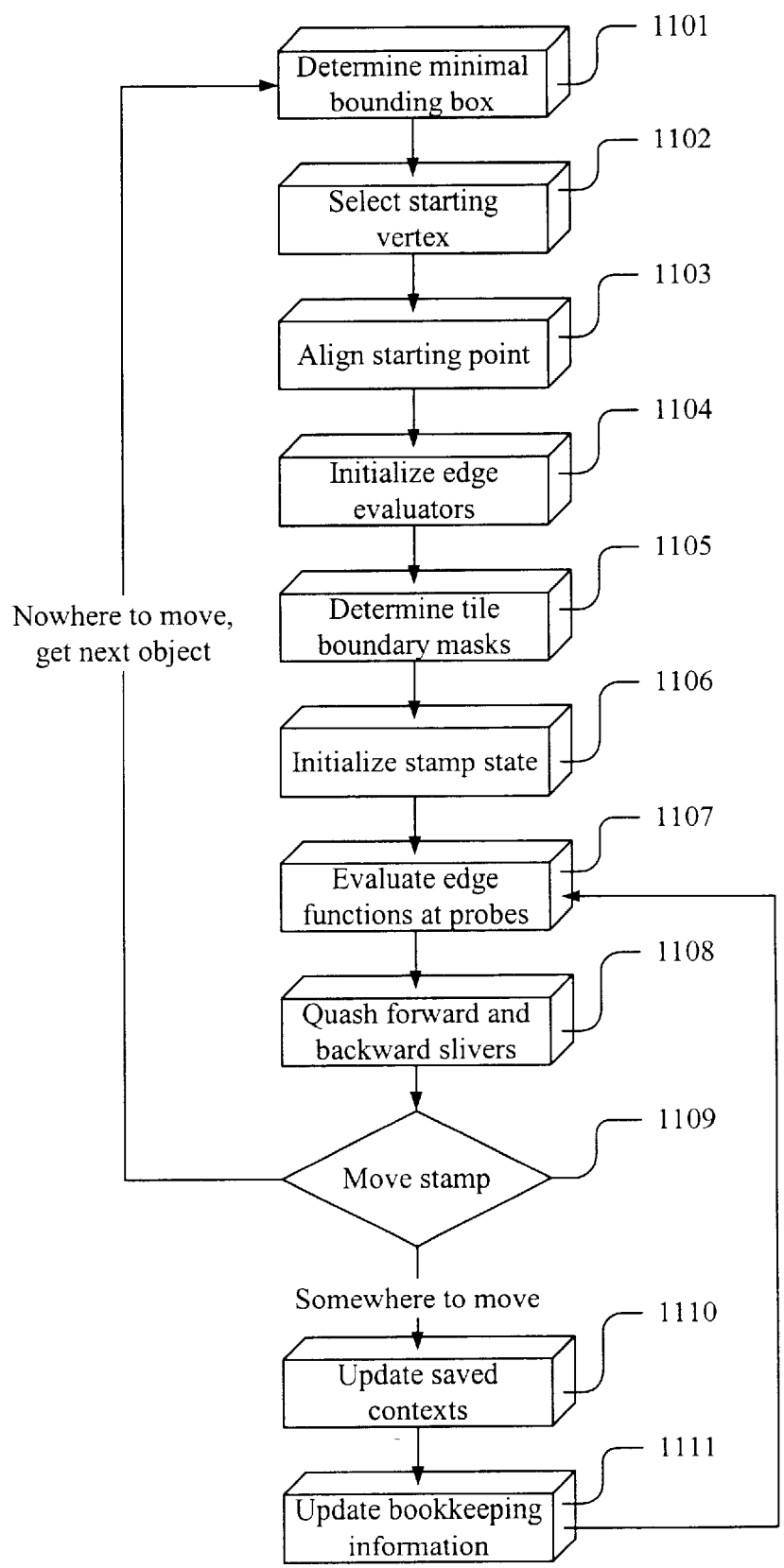
FIG. 11 is a flow diagram for the general method according to the invention.

The principle steps for the traversal methods according to the invention are shown in FIG. 11. These steps are implemented by circuits and software of the graphics accelerator 108 of FIG. 1. All of the traversal methods use the basic steps shown in FIG. 11, however, the details of Steps 1106 and 1108–1111 are substantially different for the 4-context embodiment.

Implementation Details of 6-Context Traversal Method

The 6-context (and the derived 5-context) traversal method traverses the object in stamplines that are columns, and moves from column to column left to right—when the starting vertex is at the left, or right to left—when the starting vertex is at the right.

When it is advantageous to instead use stamplines that are rows, the invention swaps the x and y offsets of the probe points that evaluate the edge equations at several locations surrounding the stamp, and also appropriately swaps a few other values dependent upon x and y. This swapping means that the stamp movement method described below need not have a column stampline case and a row stampline case, which substantially simplifies the implementation and reduces gate delays. The details of this x and y swapping are not described, as they do not change the fundamental movement method. Without loss of generality, the description below will be phrased in terms of stamplines that are columns, with the implicit understanding that swapping changes how right, left, up, and down information is multiplexed into forward, back, and over information.

When swapping is not enabled, the forward position is defined as the stamp position directly below the current position (down). The back position is directly above the current position (up). The over position is directly to the right of the current position (right) when dirOver is POSITIVE, else the over position is directly to the left of the current position (left).

If x and y swapping is enabled, the object is traversed in stamplines that are rows, in which case one can move from row to row in the top to bottom direction—when the starting vertex is at the top side of the bounding box, or the bottom to top direction—when the starting vertex is at the bottom side of the bounding box. In this case, the forward position is right, the back position is left, and the over position is down when dirOver is POSITIVE, else the over position is up.

Stamp Contexts

There are several stamp contexts: current, backSave, overSave, forwardTileSave, backTileSave, and overTileSave. Each saved stamp context has associated with it a corresponding valid bit backSaveValid, overSaveValid, forwardTileSaveValid, backTileSave Valid, or overTileSave Valid, respectively. A context's corresponding valid bit is true when some stamp position is actually saved in the context, otherwise the context is empty.

Each saved context backSave, forwardTileSave, and backTileSave has associated with it a sliver bit backSaveSliver, forwardTileSaveSliver, or backTileSaveSliver, respectively. A context's corresponding sliver bit is true when the context's valid bit is true and the position saved is determined to be a "sliver" position that is not productive (generates no fragments), and thus may not need to be visited or saved, as discussed more fully below in the descriptions of steps 1108 through 1110. The sliver bit is a hint, not absolute knowledge, because a valid context for which the sliver bit is false may or may not be an unproductive sliver position.

Each saved context overSave and overTileSave has associated with it a corresponding productive bit overSaveProductive or overTileSaveProductive, respectively. A context's corresponding productive bit is true when the context's valid bit is true and the position saved has been determined to be productive, that is, at least one sample point associated with the position is within the object. The productive bit is a hint as well, in that a valid context for which the associated productive bit is false may or may not be productive.

Saved Contexts

The saved contexts represent the following positions:

1. backSave: the position above the first stamp position in the current stampline (column) if the position above is in the same tile as the first position.

2. overSave: the first best position found in the same tile in the next (column) stampline over from the current stampline. ("First best" means that an over position known to be productive can replace a saved over position that is not know to be productive.)

3. forwardTileSave: the first best forward position found below the current position and in a different tile, as long as the stamp is moving forward from tile to tile. ("First best" means that a valid over position invalidates a sliver forwardTileSave, allowing a better position to be saved in it.)

4. backTileSave: the first best back position found above the current position and in a different tile, as long as the stamp is moving back from tile to tile, or if the stamp is in the first tile on a tileline.

5. overTileSave: the last best position found in the next tileline over (by making this the last position found, the stamp tends to visit tiles in a serpentine fashion, which increases the chances that moving from one tile to another also moves from one bank to another).

Step 1101: Determine the minimal bounding box for object.

Figure 8:
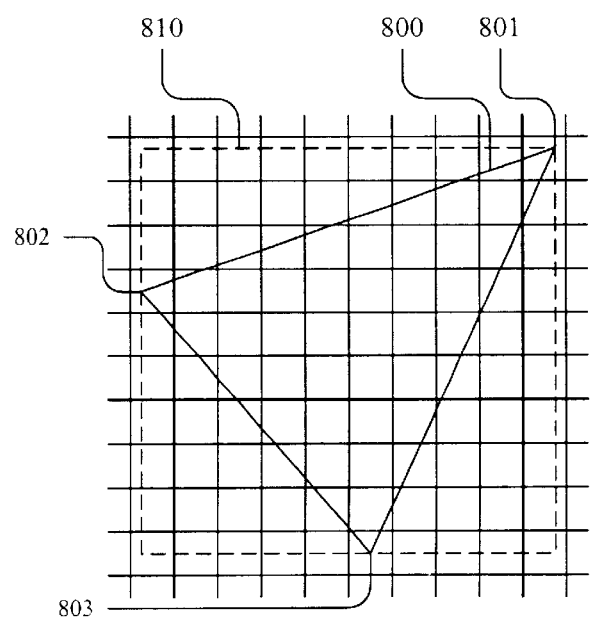
FIG. 8 is a diagram of a minimal bounding box for a polygonal object.

FIG. 11, step 1101 determines the minimal rectangular bounding box (bbox) that encloses the object and is aligned with the x and y axis. For example, FIG. 8 shows a triangle 800 drawn with solid lines, and its minimal bounding box 810 drawn with dashed lines. In this embodiment, we allow both three-sided objects like triangles, and four-sided objects like quadrilaterals and rectangular lines, so we allow up to four vertices $(x_0, y_0)$, $(x_1, y_1)$, $(x_2, y_2)$, and $(x_3, y_3)$. For simplicity of this description, assume that for triangles, the $(x_2, y_2)$ vertex is copied into the $(x_3, y_3)$ vertex. C code for FIG. 11, step 1101 is:

bbox.xmin=min($x_0$, $x_1$, $x_2$, $x_3$);
bbox.xmax=max($x_0$, $x_1$, $x_2$, $x_3$);
bbox.ymin=min($y_0$, $y_1$, $y_2$, $y_3$);
bbox.ymax=max($y_0$, $y_1$, $y_2$, $y_3$);

It is noted here that the C code here and elsewhere in this document specifies the logical operation of certain portions of the circuitry of the graphics accelerator. The listing of C code in this document does not mean that the graphics accelerator is implemented using a general purpose processor that executes C code. Rather, the C code is descriptive of the operation of dedicated logic circuits.

Step 1102: Select a Starting Vertex on a Side of the Bounding Box.

In FIG. 11, step 1102, select a starting vertex $(x_{start}, y_{start})$ that is on the side of the bounding box bbox, where start is in the range [0, 3]. That is, $(x_{start}, y_{start})$ must satisfy the condition:

($x_{start}$=bbox.xmin||$x_{start}$=bbox.xmax)||

($y_{start}$=bbox.ymin||$y_{start}$=bbox.ymax)

Such a starting vertex is called a single-extreme vertex, as this vertex is at an extreme x or y position of the bounding box. For triangle 800 in FIG. 8, all three vertices 801, 802, and 803 are single-extreme vertices.

For stamp movement methods that do not implement serpentine traversal, there are definite advantages, such as fewer stamp contexts, to starting at the corner of the bounding box. That is, $(x_{start}, y_{start})$ must satisfy the condition:

($x_{start}$=bbox.xmin||$x_{start}$=bbox.xmax)&&

($y_{start}$=bbox.ymin||$y_{start}$=bbox.ymax)

Such a vertex is called a double-extreme vertex, as it is at both an extreme x position and an extreme y position of the bounding box. For triangle 800, the vertex 801 is a double-extreme vertex. It is always possible to find a double-extreme vertex for triangles, thin OpenGL lines, Microsoft Windows objects, X11 thin lines, and wide OpenGL aliased lines. However, it is not possible to find a double-extreme vertex for X11 wide lines, nor for OpenGL antialiased lines. These objects may be rendered using fewer contexts by splitting them into two portions, each of which has a double-extreme vertex.

Step 1103: Align the Starting Position to the Stamp Size

In general, the starting vertex $(x_{start}, y_{start})$ is specified with subpixel accuracy, e.g., $(19^{15}/_{16}, 34^{2}/_{16})$. The origin of the stamp, though, typically must be aligned to an (x, y) position commensurate with the stamp dimensions. For example, if the stamp is four pixels wide by two pixels high, then the starting position must be aligned so that the x position is a multiple of four pixels, and the y position is a multiple of two pixels. This alignment of the starting position to the stamp size is performed in FIG. 11, step 1103:

$$x_{alignedStart} = x_{start} - (x_{start} \bmod stampWidth);$$

$$y_{alignedStart} = y_{start} - (y_{start} \bmod stampHeight);$$

In this embodiment, stamp Width and stampHeight are both powers of two, and so the alignment can be performed more efficiently as a masking operation:

$$x_{alignedStart} = x_{start} \&\sim(stampWidth-1);$$

$$y_{alignedStart} = y_{start} \&\sim(stampHeight-1);$$

Step 1104: Initialize the Edge Evaluators

In FIG. 11, step 1104, the edge evaluators are initialized for the aligned starting position. This involves computing the increments A and B for each edge function E(x,y)=Ax+By+C, and computing the value of each edge function at the position $(x_{alignedStart}, y_{alignedStart})$. The setup for the edge evaluators is described by Pineda in the paper incorporated above.

Step 1105: Determine the Tile Boundary Masks

FIG. 11, step 1105 establishes the tile boundary masks that are used to determine whether a stamp position is at the left, right, top, or bottom boundary of a tile. For example, the stamp is at the right-most position in a tile when several of the bits of its x coordinate are all 1. The number and position of the bits that must have a value of 1 is dependent upon the tile width and the stamp width.

For example, if the stamp is two pixels wide, then the bottom bit (bit 0) of the x coordinate will always be 0, and so the bottom bit does not need to be a 1 when the stamp is at the right-most boundary of a tile. Similarly, if the tile is, say, four pixels wide, then bits 2 or higher do not need to be a 1, as these bits reveal nothing about the stamp position within a tile.

Specifically, when the stamp is at the right-most boundary of a tile, the group of bits in the x coordinate that start at bit position $\log_2(tile Width)-1$, and extend down to and including bit position $\log_2(stamp Width)$, are all 1. Note that this group of bits is empty—that is, no bits in the mask are 1—when the stamp width is equal to the tile width. In this case, all stamp positions are at the right-most boundary of a tile. The same mask can also be used to determine if the stamp is at the left-most position in a tile. A similar mask, based upon the tile and stamp heights, can be used to determine if the stamp is at the top-most or bottom-most position in a tile. These two masks are easily constructed with the following C code:

$$xTileMask=(tileWidth-1)\&\sim(stampWidth-1);$$

$$yTileMask=(tileHeight-1)\&\sim(stampHeight-1);$$

If the tile and stamp sizes for a particular system are permanently fixed, then these masks may be hardwired in the graphical accelerator, eliminating the need for step 1105. Alternately, step 1105 may be performed only when the graphics accelerator is configured, such as at the beginning of execution of a particular graphical rendering task or session, and thus will not be repeated for each object to be rendered by the graphics accelerator.

Step 1106: Initialize the Starting Bookkeeping State of the Invention

FIG. 11, step 1106 initializes the values of all state used while traversing the object. The following are initial bookkeeping state values used herein:

```
// Traversing left to right or right to left?
dirOver = (X_start = bbox.xmin)? POSITIVE: NEGATIVE;
dirStamp = POSITIVE;       // Stamp movement inside tile in
                           forward or back direction?
dirTile = POSITIVE;        // Tile to tile movement forward or back?
firstColumnInObject = true;  // Still on the very first stampline?
firstStampInLine = true;   // First stamp position in a stampline?
firstTileInLine = true;    // First tile within a tileline?
```

Initially, all Saved Contexts are Invalid:

```
backSaveValid = false;
backSaveSliver = false;
overSaveValid = false;
overSaveProductive = false;
forwardTileSaveValid = false;
forwardTileSaveSliver = false;
backTileSaveValid = false;
backTileSaveSliver = false;
overTileSaveValid = false;
overTileSaveProductive = false;
```

Note, steps 1107 through 1111, described in the following sections, are repeated until no further stamp moves are possible in Step 1109.

Step 1107: Determine Valid, Sliver, Productive, and Boundary Bits For stamp movement purposes there are an additional three "sparse" stamp contexts. The sparse stamp contexts (which are dynamically computed each cycle) contain much less information than the full contexts described above. These sparse contexts do not include all the information associated with the interpolated values of colors, Z depth, transparency, and so on, and instead only include the edge function values for these stamp positions. Furthermore, the edge function values for these positions are not stored in flip-flop or latch circuits of the graphics accelerator 108, but are determined anew each cycle by combinational logic. These sparse contexts are:

1. forward: the stamp position immediately below the current position
2. back: the stamp position immediately above the current position
3. over: the stamp position immediately right of the current position if dirOver is POSITIVE, else the position immediately to the left.

Each of the sparse contexts forward, back, and over has associated with it a valid bit (forwardValid, backValid, or overValid, respectively) that indicates if the stamp position is valid. The sparse contexts forward and back have an associated sliver bit forwardSliver and backSliver that indicate if they have been determined to be sliver positions that might be avoided. The sparse context over has an associated productive bit overProductive that indicates whether the position has been determined to be productive. The edge functions, evaluated at several points around the stamp, determine whether the up, down, left, and right positions are valid positions which are believed to contain a portion of the object. A valid position may be marked as a sliver position if it is known that no sample points at that position are contained by the object, or as a productive position is it is known that at least one sample point is contained in the object.

The computation of the valid, sliver, and productive bits is not described in this document, as many possible computations exist. While using different computations of the valid, sliver, and productive bits may affect the number of unproductive stamp positions visited, it does not change the stamp movement method described herein.

Each of the sparse contexts xxx also has an associated xxxTileBoundary bit. First, the current position is evaluated to determine if it is at the right-most position in a tile, the left-most position, the top-most position, and the bottom-most position. Given the xTileMask computed in Step 1105, it is determined if the stamp is at the right-most position of a tile as follows:

rightBoundary=((x|~xTileMask)=~0)

That is, bit-wise OR 1's with all the positions of the stamp's x coordinate that are not relevant in determining if the stamp is at the right-most position in the tile, and check whether the result is all 1's. The result will be all 1's only if the stamp's x coordinate has all 1's in the relevant group of bits, and so is at the right-most boundary. Similarly, we can determine if the stamp is at the left-most position in the tile like:

leftBoundary=((x&xTileMask)=0)

That is, bit-wise AND 0's in all the positions of the x coordinate that are not relevant in determining if the stamp is at the left-most position in the tile, and check if the result is all 0's. The topBoundary and bottomBoundary bits are determined similarly via the yTileMask:

bottomBoundary=((y|~TileMask)=~0);

topBoundary=((y&yTileMask)=0);

These four boundary values are appropriately multiplexed to create the forwardTileBoundary, backTileBoundary, and overTileBoundary bits of the forward, back and over sparse contexts, respectively. A true value indicates that the stamp position in question is in a different tile from the current tile.

Step 1108: Quash Forward and Back Slivers

If any over context is valid, whether a sparse context (over) or saved context (overSave, overTileSave), then there is no point in moving to any sliver back and forward positions, whether sparse or saved contexts, even if the sparse or saved over context is not known to be productive. The back and forward slivers never lead to any productive stamp positions in the current stampline, but merely lead to a valid (though perhaps unproductive) stamp position in the next stampline over. Thus, a valid over position immediately quashes any sliver back and forward positions by setting their Valid and Sliver bits to false.

The C code for this quashing operation is:

```
anyOver = overValid||overSaveValid||overTileSaveValid;
if(anyOver) {
    // Invalidate all forward and back slivers, in both sparse
    and saved contexts
    if (forwardSliver)       forwardValid = forwardSliver = false;
    if (backSliver)          backValid = backSliver = false;
    if (forwardTileSaveSliver)
         forwardTileSaveValid = forwardTileSaveSliver = false;
    if (backSaveSliver)      backSaveValid = backSaveSliver = false;
    if (backTileSaveSliver)  backTileSaveValid =
                             backTileSaveSliver = false;
}
```

Step 1109: Determine the Next position to Which to Move the Stamp

The basic idea is to move forward along a stampline until reaching a tile boundary, then back along the stampline until hitting the opposite tile boundary. Then move over and do the same, until the last stampline within the tile has been completed.

At step 1109 the graphics processor moves the stamp either within the current tile or, when processing of stamp positions in the current tile is completed, to a next tile. Within the current tile, as described above, the stamp is moved in the forward direction until the forward tile boundary is reached, then the stamp is moved in the back direction until the back tile boundary is reached, and finally the stamp is moved over to the next stampline (if any) within in the tile. When moving the stamp to a next tile, the stamp is initially moved to the next tile (if any) in the forward direction. Then it generates all fragments within it, and continues until all tiles in the forward direction have been completed. The graphics processor then goes back to the tile in the back direction, and sweep out all tiles in the back direction. Finally, it goes to a tile in the next tileline in the over direction, and repeat the operations to sweep out a tileline until no more moves are possible. C code for the decision-making logic is found in Table 2 (Appendix A).

Step 1110: Update Saved Contexts

After deciding which way to move, the graphics accelerator determines which sparse contexts, if any, should be stored into their corresponding saved contexts, and which saved contexts should be invalidated. Although any given sparse context can be stored into exactly one of the saved contexts in this step, multiple different sparse contexts can be stored into multiple different saved contexts in this step.

Known productive positions slightly complicate the logic for saving over positions into overSave and overTileSave. In order to maintain the "first best" over position in overSave, an over position that is known to be productive replaces an overSave position that is not known to be productive. In order to maintain the "last best" over position in overTileSave, an over position that is not known to be productive must not replace an overTileSave position that is known to be productive.

The forwardTileSave and backTileSave contexts do not need any similar special sliver processing conditions. If, for example, a sliver forward was stored into forwardTileSave, and sometime later a better non-sliver forward position in the next tile is found, then an intervening over move of some sort was made, and the over move will have quashed the sliver forwardTileSave that was previously stored (see step 1108).

Table 3 (Appendix B) gives the C code for updating saved contexts as performed by FIG. 11, step 1110.

Step 1111: Update Other Bookkeeping Information

Finally, FIG. 11, step 1111 updates the values that indicate in which direction the stamp is moving and other information, for example, is this the first position within a stampline or tileline. The C code for this updating is given in Table 4 (Appendix C).

After completing step 1111, the process resumes at step 1107 to process the object at the current stamp position, until the movement logic of step 1109 determines that the object has been completely traversed.

Implementation Details of 5-Context Traversal Method

As an optimization, an alternative embodiment exploits the fact that all five save contexts are never active simultaneously. In this alternative embodiment, the backSave state remains conceptually, however this state does not need to have separate physical storage. Instead, the backSave state is stored in either the overSave or overTileSave state. The embodiment may still use physical storage for the backSave Valid and backSaveSliver bits, which avoids synthesizing these bits from other state information.

Table 1 shows where the conceptual backSave information resides, given the state of several bits. An "X" indicates that the state of the bit is irrelevant.

The else clause that stores back into backSave in Table 2 (Appendix B) becomes:

```
} else if(writeBackSave) {
        if (overTileBoundary) {
            overSave = back;
        } else {
            overTileSave = back;
        }
        backSaveValid = true;
        backSaveSliver = backSliver;
}
```

Implementation Details of 4-Context Traversal Method

Even better than multiplexing one context between two other contexts, it is possible to implement a tiled traversal with just three saved states. This alternative embodiment involves a different way of visiting positions within the object.

In the following sections, the meaning of the terms forward, back, and over are the same as above in the sense that forward will mean down, back will mean up, and over will mean left (dirOver NEGATIVE) or right (dirOver

TABLE 1

| firstTile InLine | dirTile? | dirStamp ? | firstStamp InLine | overTile Boundary ? | Where is backSave? |
|---|---|---|---|---|---|
| false | Negative | X | X | X | No need. Since we start each stampline at the bottom edge of each tile, we can't move forward within tile, so we never save back, but always use the back bypass. |
| false | Positive | X | X | X | No need. Since we always start each stampline at the top edge of each tile, we never have a valid back position within the tile to save. |
| true | Negative | X | X | X | Invalid state. By definition, we start each new tileline by tiling in the Positive (top to bottom) direction. |
| true | Positive | Negative | false | X | No need. backSave has already been saved and restored. |
| true | Positive | Negative | true | X | Invalid state. By definition, we start each new stampline by moving the stamp in the Positive direction. |
| true | Positive | Positive | X | false | In overTileSave, as we aren't at the overTile boundary of the tile, so it's still unused. |
| true | Positive | Positive | X | true | In overSave, as we are at the overTile boundary of the tile, so don't need it anymore. |

This table shows that only the overTileBoundary bit is needed to decide to where to store backSave, or from where to recall the previously stored context. The multiplexing for properly recalling backSave from either of the two saved positions is:

backSave=overTileBoundary? overSave: overTileSave;

POSITIVE). However the basic method visits stamplines that are columns, whereas this alternative visits stamplines that are rows.

Again, the actual implementation of the alternative can paint column stamplines by exchanging the role of x and y offsets for the position of the stamp probes and sample points, and by appropriately changing the multiplexing of left, right, up, down data into forward, back, and over data.

Saved Contexts

The saved contexts represent the following positions:

1. backSave: the first best position above the current (row) stampline.
2. forwardSave: the first best position below the current stampline.
3. overTileSave: the last best position found in the next tileline over.

The basic method proceeded along a column stampline in the forward, then back direction, before moving over. The alternative method processes each tileline in three phases, referred to as phases 0, 1, and 2 in the C code below and in Tables 5 and 6 (Appendices D and E).

This alternate implementation does not associate an overProductive bit with the sparse over context, nor an overTileSaveProductive bit with overTileSave. Rather, these contexts have associated overSliver and overTileSaveSliver bits, respectively. Again, the computation of these bits is not described here; various implementations of this computation may change the number of unproductive positions visited, but do not change the method for moving the stamp based upon this information as described below. If an over sliver bit is true, then there are guaranteed to be no productive over positions for the rest of the stampline.

The details of the alternative 4-context embodiment of steps 1106–1111 are given in the following sections labeled Step 1106a through 1111a.

Step 1106a: Initialize the Starting Bookkeeping State of the Invention C Code to Initialize State is as Follows:

```
firstStamplineInTile = true;   // Is this the very first stampline in the
                               // tileline?
firstColumnInObject = true;
phase = 0;
dirGeneral = POSITIVE;         // Flip each tileline to reverse roles of
                               // forward and back in the phases
forwardSaveValid= false;
forwardSaveSliver = false;
backSaveValid= false;
backSaveSliver = false;
overTileSaveValid = false;
overTileSaveSliver false;
```

Note, steps 1107a through 111a, described in the following sections, are repeated until no further stamp moves are possible in Step 1109a.

Step 1107a: Determine Valid, Sliver, and Boundary Bits

Step 1107a is nearly identical to step 1107 described above, except that overSliver is computed rather than overProductive.

Step 1108a: Quash Forward and Back Slivers

Sliver handling is slightly modified in the 4-context alternative embodiment due to the smaller number of saved contexts. The basic idea is the same, though. Any valid over position, even if it is a sliver, immediately invalidates any sliver back and forward positions, whether these are relative to the current stamp position, or saved positions, as in the following C code:

```
anyOver = overValid||overTileSaveValid;
if(anyOver) {
    // Invalidate all forward and back slivers
    if (forwardSliver)forwardValid = forwardSliver = false;
    if (backSliver) backValid = backSliver = false;
    if (forwardSaveSliver) forwardSaveValid = forwardSaveSliver =
    false;
    if (backSaveSliver) backSaveValid = backSaveSliver = false;
}
```

Step 1109a: Determine the Next position to Which to Move the Stamp

Here is where the alternate method differs substantially from the original method. Note that giving over moves priority means that the graphics processor cannot avoid moving to an over position that is not known to be productive, in favor of a forward or back position that is not a sliver. Further, over moves do not invalidate back or forward slivers that are not adjacent to the current stampline, as described in more detail below in step 1110a.

Phase 0

Phase 0 generates all fragments in the starting tile of a tileline that are at the same height or below the starting position in the tileline.

In phase 0, the alternative method proceeds along a row stampline in the over direction. Also saved are the first valid forward and back positions encountered, regardless of tile boundaries. When the boundary of a tile is reached in the over direction, the method saves the over position that is in the next tile to the right. Then, it loads the forwardSave context into the current context, and visits all positions within the tile in the over direction again. Continue visiting (row) stamplines until the forwardSave position to be restored is in a new tile. Then, restore the backSave position, and enter phase 1.

Phase 1

Phase 1 generates all fragments in the tileline that are above the starting position in the tileline.

In phase 1, move from stampline to stampline in the back direction, and so trace out the rest of the object in that direction that is in the current tileline. While moving in the back direction, ignore the top tile boundary, but still use the right tile boundary to stay within the current tileline. After completing the above movement, go back to the saved forward position, and enter phase 2.

Phase 2

Phase 2 generates all fragments in the tileline that are in tiles below the starting position's tile.

In phase 2, trace out the rest of the object in the current tileline in a fashion similar to phase 1, but moving from stampline to stampline in the forward direction. Similar to phase 1, ignore the bottom tile boundary, and only check for tile boundaries in the over direction.

When the method finally has no more forward stamplines to trace out in phase 2, directly proceed to the saved over position in the next tileline, and start the whole process over again in phase 0. In order to sweep out stamplines in a serpentine manner, so that page transitions that use the same bank are reduced, and to maintain locality of reference in a texture cache, the roles of forward and back (below and above) are reversed in each new tileline.

The C code for moving the stamp according to the alternative embodiment is given in Table 5 (Appendix D).

Step 1110a: Update Saved Contexts

Again, overTileSave should contain the last, best position found, so a non-sliver overTileSave position is never replaced with a sliver over position.

The cases for writeBackSave and writeForwardSave are symmetrical, because they effectively trade responsibilities as dirGeneral changes from POSITIVE to NEGATIVE. So here we'll just consider when we save into the backSave context.

Since backSave is "first, best save" for correctness, it is only possible to save into it when it is empty.

A valid back position is also required, and this cannot have used the bypass. Beyond that, if dirGeneral is POSITIVE, then it is only possible to save into backSave when this is the very first stampline of a new tileline, or if this is phase 1 and thus traveling in the back direction. If dirGeneral is NEGATIVE, then save when in phases 0 or 2.

If any kind of forward move is made, either directly to the sparse forward context, or indirectly by loading the fowardSave context, the backSaveSliver bit is set false. Symmetrically, if any kind of back move is made, the forwardSaveSliver bit is set false. This prevents step 1108a from using an unrelated valid over position to invalidate a saved sliver position that may need to be visited to get to a productive position. The C code for updating backSave, as well as forwardSave, is given in Table 6 (Appendix E).

Step 1111a: Update Other Bookkeeping Information

```
if (goOverNewTile || goOverTileSave) {
    // Start a new tileline
    phase = 0;
    firstStamplineInTile = true;
    if (serpentineEnabled) {// Reverse dirGeneral direction
        dirGeneral = (dirGeneral == NEGATIVE ? POSITIVE: NEGATIVE);
    }
}
if (goForward||goForwardSave||goBack||goBackSave) {
    firstStamplineInTile = false;
}
if (goOverInTile||goOverNewTile||goOverTileSave) {
    firstColumnInObject = false;
}
```

Simplifying and Speeding up Movement Decisions

If texture maps are stored in, for example, SRAM, in which all locations can be addressed equally quickly, the advantages of maintaining locality from tile to tile are reduced. There may also be little or no advantage when texture memory has sufficient bandwidth to absorb the occasional non-local jumps from tile to tile, or in various other scenarios.

The above alternative 4-context method, which uses a serpentine traversal from tileline to tileline, can be reduced to a simpler non-serpentine version by substituting POSITIVE wherever dirGeneral appears in the right-hand side of an assignment, and deleting all assignments where dirGeneral is on the left-hand side. Then, use standard Boolean logic to simplify the resulting code (and the corresponding circuitry).

Avoiding Sliver and Productive Bit Processing

Similarly, as mentioned above, sliver and productive bit processing improves the stamp traversal efficiency significantly when generating aliased fragments, but has a much smaller effect when generating antialiased fragments.

There is a circuit delay cost to determining and using sliver and productive information. If the goal of the graphics accelerator is solely or primarily antialiased fragment generation, then faster antialiased fragment generation may result from not determining or using sliver or productive information. With respect to the above methods, just replace forwardSliver, backSliver, overProductive, and overSliver with false, and then simplify the code (and the corresponding circuitry) using standard Boolean logic. The reduced cycle time may well outweigh the disadvantage of visiting a few additional unproductive positions.

Increasing the Likelihood That a Page Crossing Uses Different Banks

When tiles are configured such that the traversal generates all fragments on a given DRAM page before moving to another page, it is preferred to always move from a page in one memory bank to a page in another memory bank so as to maximize page prefetching opportunities. In this case, replace the overTileSave state with two states: overTileSaveEven and overTileSaveOdd. Determining whether an (x, y) position is in an even or odd tile is easy, as it merely requires logically XORing a bit from the stamp's x coordinate with a bit from its y coordinate:

$$\text{OddTile}(x,y)=x[\log_2(\text{tileWidth})]\hat{}\,(y[\log_2(\text{tileHeight})];$$

where z[n] means "the $n^{th}$ bit of z."

The code sequences (and corresponding circuitry) that implement saving over can be broken into two cases: even over tiles are saved in overTileSaveEven; and odd over tiles are saved in overTileSaveOdd. The code sequences (and corresponding circuitry) that use overTileSave are broken into two cases as well, and choose overTileSaveEven if current is in an odd tile; else choose overTileSaveOdd. In addition, it is necessary to manage other small details, for example, invalidate both overTileSaveEven and overTileSaveOdd where the old code invalidates overTileSave.

Traversal Using Subset Metatiling

The above concepts of traversing an object in a tile by tile manner can be extended to any number of levels of tiling. For example, some specialized DRAM devices (3DRAM and CDRAM from Mitsubishi, in particular), have a small first-level cache with cache lines that are much smaller than the second-level bank cache that holds pages.

For these RAMs, it would be desirable to first generate all fragments in a first-level cache line, then all fragments in all the other first-level cache lines that are still within the same page, and then generate all fragments in the next page, again generating the fragments within that page first-level cache line by first-level cache line, etc.

Any of the methods above can be extended by adding more save contexts to maintain information about how to move to a new metatile. For example, the 4-context alternative can be extended with the three contexts forwardTileSave, backTileSave, and overMetaTileSave.

Figure 9:
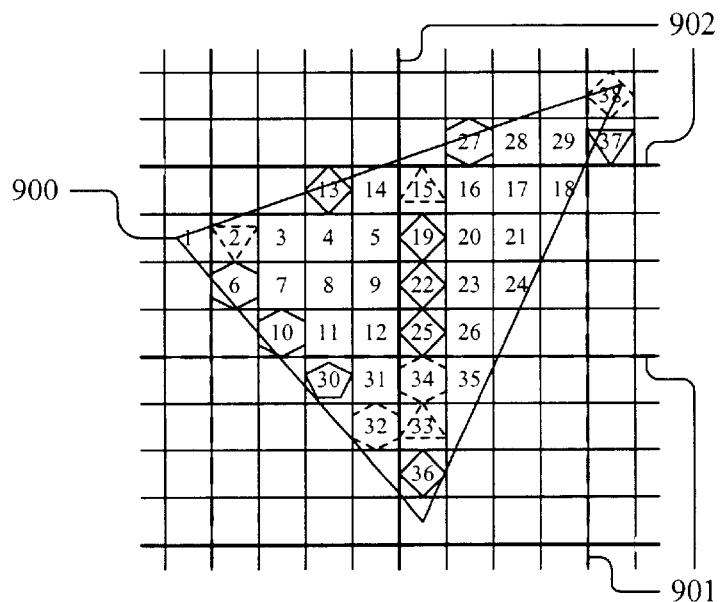
FIG. 9 a diagram of a metatiled traversal of a polygonal object.

FIG. 9 shows an example of such a traversal order for a triangle 900. Here, the thick dashed lines 901 are metatile boundaries, and the thick solid lines 902 are normal tile boundaries. In this case, the tile size has been reduced to 4×4 pixels, while the metatile size is 8×8 pixels. This example has no need for backTileSave, but locations where the forwardTileSave context is used are shown by pentagons (6, 10, etc.), and an overMetaTileSave context save is shown with an upside down triangle (37).

This metatiling type of traversal can also be used for other purposes. Assume that the tile size used for the texture cache is smaller than the tile size used to match a page. It may be advantageous to use metatiling, where the size of a metatile is the size of a page, in order to both reduce misses to the texture cache, as well as reduce page crossing overhead in the frame buffer.

Non-subset Metatiling

Above, tiled and metatiled traversal has been described in terms of a single destination pixel grid. This works well for filling areas of a rendering surface with data that are interpolated from vertices. This method also works for texture mapping, where maximizing cache hits is probably the biggest performance issue. However, this type of traversal does not work well for copying pixel data from one portion of a frame buffer to another, where a given tile size and origin may not be appropriate for both the source and destination grids.

In this case, the source and destination rectangles being copied are usually not aligned with each other. For example, a graphics application might copy a 25×25 pixel rectangle from location (5,6) in the source grid to a location (19,35) in the destination grid. Even when the source and destination pages have identical dimensions, if the tile size and origin is configured for the destination grid, a destination tile will map very rarely to a single page in the source grid. A destination tile will sometimes map to two pages in the source grid, and will map most often to four pages in the source grid.

By adding an offset or otherwise arithmetically modifying the destination (x,y) values, it is possible, for example, to map tiles to match the source pixel grid. This simply reverses the problem: a single page in the source pixel grid maps to one, two, or four pages in the destination grid.

To further complicate things, the source and destination grids may have different page dimensions. For example, the source grid may be an off-screen array of pixels, and thus use square pages, while the destination grid may be the displayable screen, and thus be more rectangular in order to accommodate screen refresh operations. Finally, the source and destination grids may even have different numbers of pixels per page. For example, if a source grid of 32-bit pixels Oust RGBA) is copied into a destination grid of 128-bit pixels (front and back buffered RGBA, plus Z depth, stencil, and other information), then the source pages will contain four times as many pixels as the destination pages.

In many systems, especially those using more than two banks, it would be advantageous to use tiled traversal to, for example, visit all locations in a destination page before moving to the next destination page, and within a destination page to also generate all fragments being copied from one source page before moving to another source page. Rather than bouncing between the portions of the four source pages required to fill a destination page, this scheme, instead, localizes the access to source data as much as possible.

Source to Destination Traversal Using Metatiling

By adding a signed offset vector to the destination (x, y) position, one can map destination positions into source positions, and thus define metatiles that correspond to physical entities, such as memory pages, in the source. If metatiles are aligned to destination pages, while tiles are aligned to source pages or vice-versa), then overlaying both the tile and metatile grids on the destination creates a composite grid with several different rectangle sizes that are not restricted to powers of two in width and height.

The metatiling method suggested in the previous sections then has the best possible behavior one can expect for copying pixel data. Traversal with metatiling generates all fragments on a destination page (a metatile) before moving to another destination page. The method further generates all fragments on the portion of a source page (tile) that is within the current metatile before moving to the portion of a different source page that is within the same metatile.

Even if full metatiling is not sufficiently useful to warrant implementation in a system, it may still be desirable to support pixel copy metatiling with fewer additional contexts. Copies are rectangular in shape, and thus fragment generation can begin at a double-extreme vertex. Furthermore, because the source and destination rectangles may overlap, copies must not serpentine their way through the rectangle, but must proceed in a typewriter-like fashion from tile to tile. Thus, it is possible to implement pixel copy metatiling with just five contexts: current, forwardSave, forwardTileSave, overTileSave, and overMeta TileSave.

An actual implementation must deal with starting at any vertex, in order to properly handle overlapping copies. However, for simplicity of this description, assume that one starts at the upper left corner. The forwardSave context always records the first position found on the stampline below that is in the same metatile. The forwardMetaTileSave context records the first position found on the stampline below that is in the next metatile down.

The overTileSave context records the first position found to the right that is in the next tile, while overMetaTileSave records the first position found to the right that is in the next metatile. Thus, although the movement methods must be slightly different for general (non-metatiled) polygons and for (metatiled) pixel copies, the storage would increase by a single context.

Figure 10:
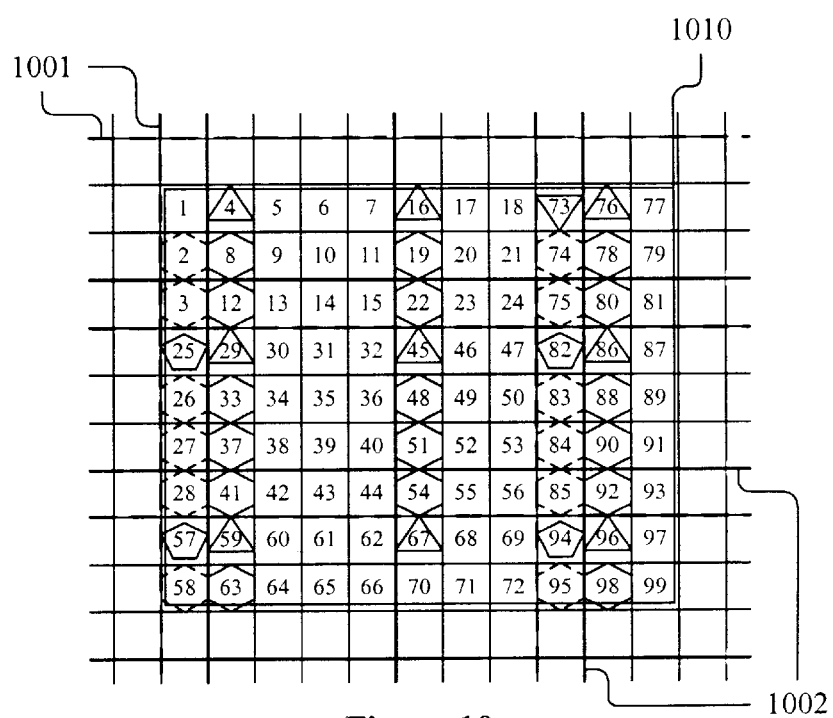
FIG. 10 is a diagram of a metatiled traversal of a rectangle for copying the rectangle to a second location.

FIG. 10 shows an example of a metatiling traversal order for copying pixel data from destination locations to source locations. The 4×4 pixel source page tiles are shown with thick solid lines 1002, the 8×4 pixel destination page metatiles with thick dashed lines 1001. The rectangle of pixel 1010 being copied is shown in destination space. Positions saved in fowardSave are in hexagons, fowardTileSave pentagons, overTileSave triangles, and overMetaTileSave in upside-down triangles.

Graphics Accelerator Logic

Figure 12:
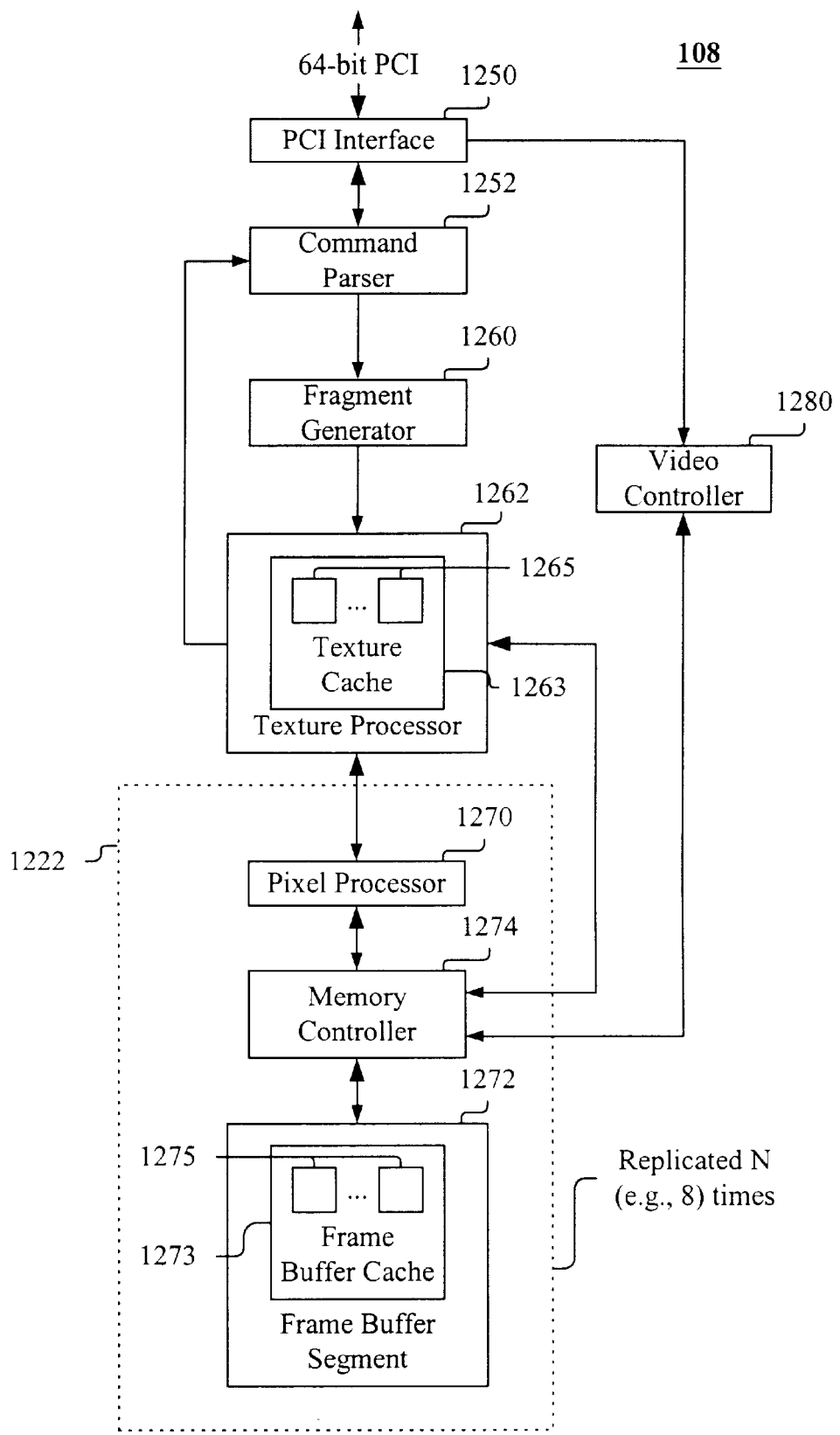
FIG. 12 is a diagram of a graphics engine.

FIG. 12 depicts a simplified representation of the graphics accelerator 108 (FIG. 1). An interface 1250, such as a PCI interface, couples the graphics accelerator to the system chipset 104 (FIG. 1). Graphics rendering and other commands received from the processing unit 102 (FIG. 1) via the system chipset are parsed by a command parser 1252. The parser 1252 determines the object rendering operations to be performed, and passes these to a fragment generator 1260, which will be described in more detail with reference to FIGS. 13 and 14. Fragments generated by the fragment generator 1260 are further processed by a texture processor 1262 so as to apply a specified texture pattern, if any, to the object being rendered. The resulting fragments are then passed to one or more pixel pipelines 1222 for pixel processing and storage. A pixel pipeline 1222 preferably includes a pixel processor 1270 for storing fragments into the frame buffer segment 1272 via a memory controller

1274. The pixel processor 1270 may perform tasks such as combining a fragment previously stored in the frame buffer segment 1272 with a fragment obtained from the graphics accelerator 108 and then storing the resulting combined fragment back into the frame buffer segment 1272.

A video controller 1280 couples the plurality of frame buffer segments 1272 to a display device 126 (FIG. 1). The video controller 1280 reads pixel values from the frame buffer segments 1272 via memory controller 1274 and sends corresponding pixel information to the display device 126 for display.

Each frame buffer segment 1272 preferably includes a frame buffer cache 1273 having a plurality of frame buffer cache lines 1275 for storing image information. Each frame buffer cache line 1275 preferably stores the fragment information for a plurality of pixels. Furthermore, the size of the frame buffer cache lines, in terms of the number of pixels whose fragment information is stored within each cache line, is used to determine the size of the tiles used by the graphics processor. In particular, the frame buffer is partitioned into frame buffer segments 1272 that are distributed across the plurality (e.g., eight) of pixel pipelines 1222, and tiles are sized so that the fragment information for each tile is stored in an integer number of frame buffer cache lines, said integer number being equal to the number of pixel pipelines 1222. Preferably the fragment information for each tile is stored in one cache line 1275 from each frame buffer segment 1272 (each of which is used by one of the plurality of pixel pipelines 1222), as opposed to being stored in a plurality of frame buffer cache lines from a single frame buffer segment 1272.

In summary, the tiles are sized to that the fragment information for each tile is stored in an integer number of frame buffer cache lines, and further all the pixels whose information is stored in any one cache line fall within a single tile. Sizing the tiles in this way, and organizing the storage locations of fragment information for pixels in this way, allows for efficient usage of the memory resources in the graphics processor.

A portion of frame buffer (which comprises the plurality of frame buffer segments 1272) is used as a texture map memory and the texture processor 1262 preferably includes a texture map cache 1263 having a plurality of texture map cache lines 1265. Texture map pattern information in stored in the texture map cache lines 1265, and the size of the texture map cache 1263 and the texture map cache lines 1265 is taken into account in sizing the tiles used by of the graphics processor when texture mapping is enabled. In particular, the texture map cache 1263 preferably stores texture map information for the plurality of pixels that fall within a single tile, and the texture map information required by the current texture mapping mode for an entire tile is preferably approximately the size of the texture cache, on average, over a range of representative textured surfaces. Further, a useful rule of thumb is that the tiles should be sized so that, in a worst case tile, the texture information associated with the pixels in the tile has a storage size that is not larger than twice the capacity of the texture map cache.

Figure 13:
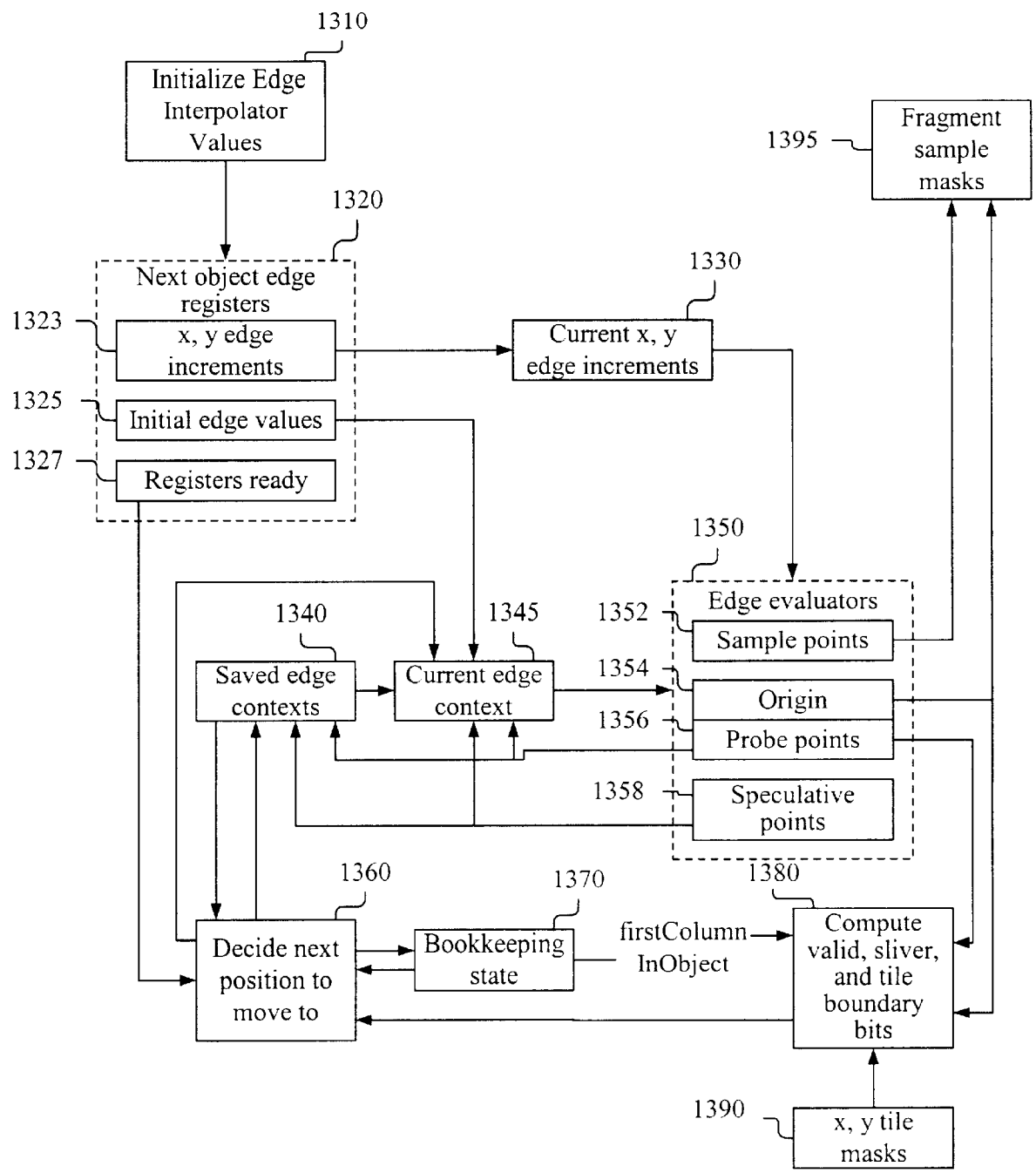
FIG. 13 is a diagram of a portion of the fragment generator of FIG. 12 that generates edge contexts.
Figure 14:
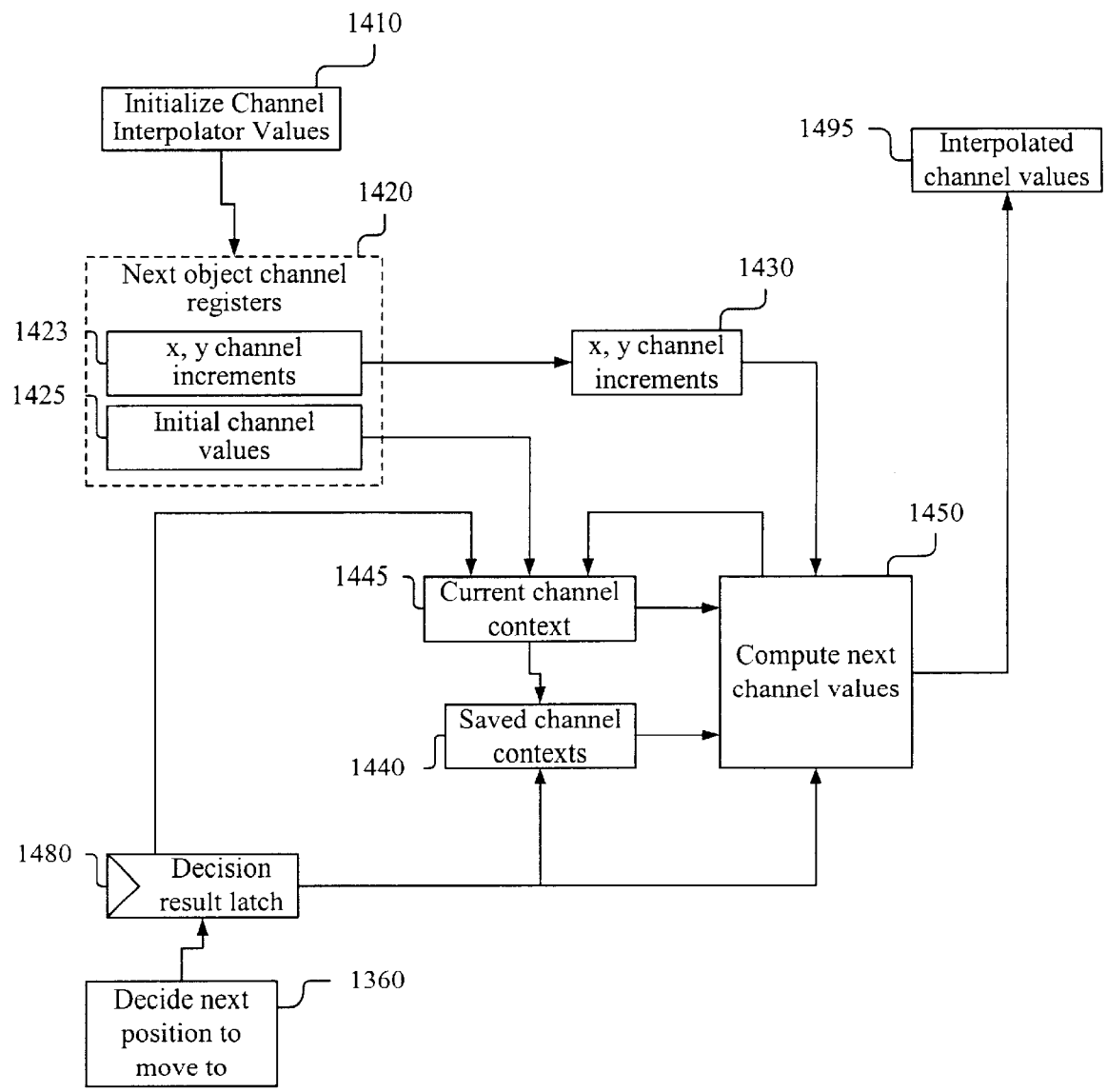
FIG. 14 is a diagram of a portion of the fragment generator of FIG. 12 that generates channel contexts.

FIGS. 13 and 14 show some of the circuitry of the fragment generator 1260. Edge initialization logic 1310 generates or provides edge and edge increment values for the next object to be rendered that are stored in a set of next object edge registers 1320. These registers 1320 include next object x and y edge increment registers 1323, and next object initial edge values registers 1325. Next object registers ready flag 1327 is enabled when registers 1325 and 1323 contain valid edge and edge increment values, and when registers 1425 and 1423 (FIG. 14), described below, contain valid channel and channel increment values. After one primitive object has been rendered, when the next object registers ready flag 1327 is set, the next object x and y edge increments 1323 are loaded into the current x and y edge increments 1330, and the next object initial edge values 1325 are loaded into the current edge context 1345.

Each of the saved contexts (described above in detail for the various embodiments) includes a saved edge context, stored in registers 1340, and a saved channel context, stored in registers 1440 (FIG. 14). A data structure representation of an edge context is shown in FIG. 16, and includes four edge function values plus a valid flag and a sliver flag. (The over contexts contain a productive flag rather than a sliver flag for the 5-context and 6-context embodiments.) Each of the edge function values represents the evaluation of a half-plane edge function at the origin of the stamp location associated with the saved context. A data structure representation of a channel context is shown in FIG. 17, and includes color, transparency, depth, fog, texture coordinate, texture derivative and x and y coordinate values.

The current context includes the current edge context, stored in registers 1345, and the current channel context, stored in registers 1445 (FIG. 14).

Each of the three sparse contexts forward, back, and over includes only an edge context. The sparse edge contexts are not stored in registers 1340, but are generated by edge evaluators 1350

The current edge context 1345 and the current x and y edge increments 1330 are conveyed to a set of edge evaluators 1350. The edge evaluators 1350 are used to determine whether various points in and around the current stamp fall within the object being rendered. Each edge evaluator contains circuitry for evaluating a set of half-plane edge functions, by adding appropriate multiples of the current x and y edge increments 1330 for each edge to the edge values from the current edge context 1340. Each set of edge evaluators together determine whether a given (x, y) position of a pixel or sample point is within a specified object. Edge evaluation is described above with respect to step 1107 and 1107a.

There are edge evaluators 1352 for evaluating the sample points in the current stamp, an edge evaluator 1354 for the origin of the current stamp, edge evaluators 1356 for evaluating probe points around the current stamp, as well as edge evaluators 1358 for evaluating speculative points around the current stamp, in particular, the origin of the stamp positions immediately to the left and above the current position.

FIG. 15 depicts exemplary edge evaluation locations for a 4×2 stamp. The locations marked by X's are sample points in the stamp, the location marked by a circle is the origin of the stamp, the locations marked by diamonds are probe points, and the locations marked by a square are speculative points. The edge evaluators 1352 (FIG. 13) for all seven sample points, as well as the edge evaluator 1356 for probe point RB, compute only the sign bit of the half-plane functions, as these values are needed only for testing if points are inside the object being rendered. The edge evaluator 1358 for the speculative points SB and SO, as well as the edge evaluator 1356 for probe point LB and RT, compute the full half-plane function values, as these values may be loaded into the current edge context 1345 if the stamp movement decision circuitry 1360 moves the stamp back, over (when dirOver is NEGATIVE), forward, or over (when dirOver is POSITIVE), respectively. The origin edge evaluator 1354 passes the current edge context values 1345 through without modifying them. The probe points are preferably at fixed locations for a given stamp size, and are always all evaluated.

The results generated by the origin and sample point edge evaluators 1354 and 1352, respectively, are used to form a fragment sample mask 1395. The mask is a set of bits indicating which sample points of the stamp fall within the object being rendered.

The results generated by the probe point edge evaluators 1356 are used by logic 1380 to compute valid, sliver, productive, and tile boundary bits. This logic is described above with respect to step 1107 and 1107a. The x and y tile masks 1390 used by the compute logic 1380 are described above with respect to step 1105.

Stamp movement decision circuitry 1360 is described in detail above with respect to step 1109 and 1109a. This circuitry 1360 uses information from the saved edge contexts 1340, information from bookkeeping state circuitry 1370, and the valid, sliver, productive, and tile boundary bits from logic 1380. The stamp movement decision circuitry 1360 generates control signals for updating the saved edge contexts 1340, the current edge context 1345, and the bookkeeping state 1370. The stamp movement decision is also used by the channel context update circuitry shown in FIG. 14.

Channel initialization logic 1410 (FIG. 14) generates or provides initial channel and channel increment values that are stored in a set of next object channel registers 1420. These registers 1420 include next object x and y channel increment registers 1423, and next object initial channel value registers 1425. After one primitive object has been rendered, the next object x and y channel increments 1423 are loaded into the current x and y channel increments 1430, and the initial channel values 1425 are loaded into the current channel context 1345.

While the current edge context 1345 contains the edge values for the stamp origin during the current cycle, the current channel context 1445 contains the channel values for the stamp origin on the previous cycle. The current edge context 1345 is needed immediately in a cycle, so that the probe point edge evaluators 1356 can quickly deliver results to the stamp movement decision circuitry 1360. Between the probe point edge evaluators 1356 and the speculative point edge evaluators 1358, the edge functions are completely evaluated to their full precision for the four adjacent Manhattan stamp positions to which the stamp may immediately move. A similar arrangement for channels would require evaluating all channel values for these nearby positions, then multiplexing between these possibilities and the saved channel contexts using control signals from the stamp movement decision circuitry 1360. Unlike edge function values, channel values are not needed by stamp movement decision circuitry 1360, and so this arrangement wastefully evaluates channel values for positions that will not be moved to. To reduce the logic devoted to computing channel values, the logic in FIG. 13 delays computing channel values until after the stamp movement decision circuitry 1360 generates stable control signals. Allowing this channel computation to proceed in the same cycle in which the stamp movement decision is made would require increasing the cycle time of the logic shown in FIGS. 13 and 14. Instead, the channel computation logic in FIG. 14 saves the control signals from stamp movement decision circuitry 1360 (FIG. 13) in decision result latch 1480, and computes the channel values during the next cycle.

The compute next channel values logic 1450 selects channel data from the current channel context 1445 if the decision result latch 1480 indicates a move to an adjacent position, or from one of the saved channel contexts in registers 1440 if the decision result latch 1480 indicates a move to a saved position. The compute next channel values logic 1450 adds the appropriate multiples of the x and y channel increments 1430 to the selected context to compute the interpolated channel values 1495 and to load into the current channel context 1445 for use in the next cycle. If the decision result latch 1480 indicates that one or more adjacent position should be saved, the current channel context 1445 is loaded into the appropriate contexts in saved channel contexts 1440.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

TABLE 2

APPENDIX A

```
goForwardInTile = goBackSave = goBackInTile = goOverInTile = goOverSave
    = goForwardTileSave = goForwardNewTile = goBackNewTile
    = goBackTileSave = goOverNewTile = goOverTileSave = false;
if (forwardValid && !forwardTileBoundary && (dirStamp == POSITIVE)) {
    // forward is valid, inside this tile, and we're already moving forward in this
stampline.
    goForwardInTile = true;
    current = forward;
} else if (backSaveValid) {
    // Saved back position in this tile is valid, so go back to it and then start moving
    // backward through stampline
    goBackSave = true;
    current = backSave;
} else if(backValid && !backTileBoundary
    && (firstStampInLine||(dirStamp == NEGATIVE))) {
    // Back position valid, inside this tile, and either (1) we're at the first
    // position in this stampline (and no forward move within tile), so we want
    // to bypass directly to back, or (2) we're already going backward in this stampline
    goBackInTile = true;
    current = back;
```

TABLE 2-continued

APPENDIX A

```
} else if (overValid && !overTileBoundary
        && (!overSaveValid||(!overSaveProductive && overProductive))) {
    // over valid, in this tile, and either no saved over in this tile, or else over is
    // strictly superior to overSave. This implements "first-save" semantics for
    // over, which is not needed for correctness, but which increases the hit rate
    // of the texture cache by minimizing the variance in the number of fragments
    // generated between fragments that are adjacent in the over direction.
    goOverInTile = true;
    current = over;
} else if (overSaveValid) {
    // Saved over in this tile is valid, use it
    goOverSave = true;
    current = overSave;
// If we get to any of the tests below, it means that the current tile has been
// completely generated, and we now need to decide what tile to go to next.
} else if (forwardTileSaveValid) {
    // Saved forward in new tile is valid (choosing saved position rather than
    // the sparse combinational forward in a new tile implements "first-save"
    // semantics, which is needed for correctness)
    goForwardTileSave = true;
    current = forwardTileSave;
} else if(forwardValid && forwardTileBoundary && dirTile == POSITIVE) {
    // Forward valid, in new tile, and we're moving from tile to tile in the positive
direction
    goForwardNewTile = true;
    current = forward;
} else if(backTileSaveValid) {
    // Saved back tile is valid, and at this point we have no more work within the tile,
    // and we can't move forward to a new tile. Again, we must choose a saved position
    // before a combination back position in a new tile for correctness.
    goBackTileSave = true;
    current = backTileSave;
} else if (backValid && backTileBoundary
        && (firstTileInLine||(dirTile == NEGATIVE))) {
    // Looks almost like moving directly to back position within tile. The back
    // position is valid and in a new tile, and either this is the first tile in the stampline,
    // or we're already moving backward from tile to tile.
    goBackNewTile = true;
    current = back;
} else if (overValid && overTileBoundary
        && (!overTileSaveValid || !overTileSaveProductive || overProductive)) {
    // Over is valid and in new tile, and either no saved over position in
    // new tile, or else over is at least as good as saved state. This
    // implements "last-save" semantics, which seems to reduce page
    // crossings in which both pages are in the same bank.
    goOverNewTile = true;
    current = over;
} else if(overTileSaveValid) {
    goOverTileSave = true;
    current = overTileSave;
} else {
    // We've generated all fragments within the object.
    Get new object and go to Step 1;
}
```

TABLE 3

APPENDIX B

```
// Any more positions to visit in this stampline in this tile?
moreInStampline = goForwardInTile||goBackInTile||backSaveValid;
// Any more positions to visit in this tile?
moreInTile = moreInStampline||goOverInTile||overSaveValid;
// Any more tiles to visit in this tileline?
moreInTileline = moreInTile||goForwardNewTile||goBackNewTile
        ||forwardTileSaveValid ||backTileSaveValid;
// Save back into backSave if it's valid and inside this tile, and this is the very
// first stamp position within the stampline, and we'll be moving forward inside
//this tile
writeBackSave = backValid && !backTileBoundary && firstStampInLine
        && forwardValid && !forwardTileBoundary;
if (goBackSave) {
    backSaveValid = false;
    overSaveSliver = false;
```

TABLE 3-continued

APPENDIX B

```
} else if(writeBackSave) {
    backSave = back;
    backSaveValid = true;
    backSaveSliver = backSliver;
}
// Save first over position found inside this tile into overSave as long as we
// still have other positions to visit in this stampline (that is, we don't take the
// goOverInTile bypass). Also allow replacement of overSave if it is not known
// productive and over is known productive.
writeOverSave = overValid && !overTileBoundary && moreInStampline
    && (!overSaveValid || (!overSaveProductive && overProductive));
if(goOverSave || goOverInTile) {
    overSaveValid = false;
    overSaveProductive = false;
} else if(writeOverSave) {
    overSave = over;
    overSaveValid = true;
    overSaveProductive = overProductive;
}
// Save first forward position found in new tile into forwardTileSave as
// long as we're moving from tile to tile in the forward direction, and we
// have more positions to visit in the current tile. We don't have to worry
// about replacing a saved sliver with a non-sliver position, because to get to
// the non-sliver position we'll have moved to a new stampline due to over being
// valid, and that will have zapped any saved forward and back sliver positions.
writeForwardTileSave = forwardValid && forwardTileBoundary
    && (dirTile == POSITIVE) && !forwardTileSaveValid
    && moreInTile;
if (goForwardTileSave) {
forwardTileSaveValid = false;
forwardTileSaveSliver = false;
} else if (writeForwardTileSave) {
    forwardTileSave = forward;
    forwardTileSaveValid = true;
    forwardTileSaveSliver = forwardSliver;
}
// Save first back position found in new tile into backTileSave, as long as
// we've in the first tile in a stampline, or else we're moving from tile to
// tile in the back direction.
writeBackTileSave = backValid && backTileBoundary
    && (firstTileInLine || (dirTile == NEGATIVE))
    && !backTileSaveValid && !goBackNewTile;
if(goBackTileSave) {
    backTileSaveValid = false;
    backTileSaveSliver = false;
} else if(writeBackTileSave) {
    backTileSave = back;
    backTileSaveValid = true;
    backTileSaveSliver = backSliver;
}
// Save last over position found in new tile to overTileSave (as long as we don't replace a
// known productive with a not known productive), but only if we have other work to do in this
// stampline (that is, we don't take the goOverNewTile bypass).
writeOverTileSave = overValid && overTileBoundary
    && moreInTileline
    && (!overTileSaveValid || !overTileSaveProductive || overProductive);
if (goOverTileSave || goOverNewTile) {
    overTileSaveValid = false;
    overTileSaveProductive = false;
} else if (writeOverTileSave) {
    overTileSave = over;
    overTileSaveValid = true;
    overTileSaveProductive = overProductive;
}
```

TABLE 4

APPENDIX C

```
// Moving in forward direction in stampline unless we choose one of the
// two back moves within a tile
dirStamp = ((goBackInTile || goBackSave) ? NEGATIVE:POSITIVE);
if (goBackNewTile || goBackTileSave) {
    dirTile = NEGATIVE;
} else if (goOverNewTile || goOverTileSave) {
    dirTile = POSITIVE;
} else {
    // leave it whatever it was
}
```

TABLE 4-continued

APPENDIX C

```
firstStampInLine = !(goForwardInTile || goBackSave || goBackInTile);
if (goOverNewTile || goOverTileSave) {
    firstTileInLine = true;
} else if (goForwardTileSave || goForwardNewTile
        || goBackTileSave || goBackNewTile) {
    firstTileInLine = false;
} else {
    // leave it whatever it was
}
if (goOverInTile || goOverNewTile || goOverSave || goOverTileSave) {
    firstColumnInObject = false;
} else {
    // leave it whatever is was
}
goto Step 1107;
```

TABLE 5

APPENDIX D

```
goForward = goForwardSave = goBack = goBackSave
    = goOverInTile = goOverNewTile = goOverTileSave = false;
oldPhase = phase;
if(overValid && !overTileBoundary && !overSliver) {
    // over valid, not a sliver, and in this tile
    goOverInTile = true;
} else if (phase == 0&&
    ((dirGeneral = POSITIVE
        && (forwardSaveValid || forwardValid) && !forwardTileBoundary)
    || (dirGeneral == NEGATIVE
        && (backSaveValid  || backValid)   && !backTileBoundary))) {
    // There is work to do yet in phase 0, so move to a new scanline
    // in the dirGeneral direction
    if (dirGeneral = POSITIVE) {
        if(forwardSaveValid) {
            goForwardSave = true;
        } else {
            goForward = true;
        }
    } else {
        if (backSaveValid) {
            goBackSave = true;
        } else {
            goBack = true;
        }
    }
} else if ((dirGeneral = POSITIVE
    && (backSaveValid  || (backValid   && (firstStamplineInTile || phase == 1))))
    || (dirGeneral = NEGATIVE
    && (forwardSaveValid || (forwardValid && (firstStamplineInTile || phase == 1))))) {
    // There is work to do in phase 1, so move to a new scanline in the opposite of
    // the dirGeneral direction
    phase = 1;    // In case it is currently 0
    if (dirGeneral = POSITIVE) {
        if (backSaveValid) {
            goBackSave = true;
        } else {
            // Either we're already heading back, or we're still on the first
            // stampline in the tileline. In either case it's okay to use the bypass.
            goBack = true;
        }
    } else {
        if (forwardSaveValid) {
            goForwardSave = true;
        } else {
            goForward = true;
        }
    }
}
```

TABLE 5-continued

APPENDIX D

```
} else if ( (dirGeneral == POSITIVE
            && (forwardSaveValid || ((phase & 1) == 0 && forwardValid)))
         || (dirGeneral = NEGATIVE
            && (backSaveValid   |((phase & 1) == 0 && backValid)))) {
    // There's work to do in phase 2, so move to a new scanline in the dirGeneral
direction.
    phase = 2;
    if (dirGeneral == POSITIVE) {
        if (forwardSaveValid) {
            goForwardSave = true;
        } else {
            // Either we're already heading forward in phase 2, or else
            // we're still in phase 0, but there was nothing to do in phase 1
            // so we're skipping directly to phase 2. In either case it's
            // okay to use the bypass
            goForward = true;
        }
    } else {
        if(backSaveValid) {
            goBackSave = true;
        } else {
            goBack = true;
        }
    }
} else if (overValid && !overTileBoundary) {
    // over valid and in this tile. It's a sliver, but we didn't find anything more
    // useful to do above, so we have to take it.
    goOverInTile = true;
} else if (overValid && (!overTileSaveValid || overTileSaveSliver || !overSliver)) {
    // Use the over bypass, as either no saved value, or else we want to take the
    // last best over position in the new stampline, and this over is no worse than
    // saved over
    goOverNewTile = true;
} else if (overTileSaveValid) {
    goOverTileSave = true;
} else {
    load new object and go to Step 1; // Nothing left to do in this object
}
if (goOverInTile) {
    current = over;
} else if (goOverNewTile) {
    current = over;
} else if(goOverTileSave) {
    current = overTileSave;
} else if(goForwardSave) {
    current = forwardSave;
} else if (goForward) {
    current = forward;
} else if (goBackSave) {
    current = backSave;
} else if (goBack) {
    current = back;
} else {
    assert (0);
}
```

TABLE 6

APPENDIX E

```
writeBackSave = backValid && !backSaveValid && !goBack
        && ((dirGeneral == POSITIVE && (firstStamplineInTile || oldPhase == 1))
         (dirGeneral == NEGATIVE && ((oldPhase & 1) == 0)));
if (goBackSave) {
    backSaveValid = false;
    backSaveSliver = false;
} else if (writeBackSave) {
    backSave = back;
    backSaveValid = true;
    backSaveSliver = backSliver;
}
writeForwardSave = forwardValid && !forwardSaveValid && !goForward
        && ( (dirGeneral = NEGATIVE && (firstStamplineInTile || oldPhase == 1))
          || (dirGeneral = POSITIVE && ((oldPhase & 1) == 0)));
```

TABLE 6-continued

APPENDIX E

```
if (goForwardSave) {
    forwardSaveValid = false;
    forwardSaveSliver = false;
} else if (writeForwardSave) {
    forwardSave = forward;
    forwardSaveValid = true;
    forwardSaveSliver = forwardSliver;
}
// Last-save, but only if current over is no worse than saved position
writeOverTileSave = overValid && overTileEdge
    && !goOverNewTile
    && (!overTileSaveValid || overTileSaveSliver || !overSliver);
if (goOverTileSave || !goOverNewTile) {
    overTileSaveValid = false;
    overTileSaveSliver = false;
} else if (writeOverTileSave) {
    overTileSave = over;
    overTileSaveValid = true;
    overTileSaveSliver = overSliver;
}
// We cannot treat forward or back positions as slivers once we move away from the
// stampline in which they were marked slivers.
if (goForward || goForwardSave) {
    backSaveSliver = false;
}
if (goBack || goBackSave) {
    forwardSaveSliver = false;
}
```

We claim:

1. A method for traversing pixels of a graphic object with a stamp, the graphic object being defined with respect to an array of pixels that is divided into an array of rectangular tiles, comprising:

moving the stamp along on a stampline, within one of the tiles, until a boundary of the tile or a boundary of the graphic object is reached;

saving information associated with a stamp position that is in an adjacent tile, if any, into a corresponding stamp context of a plurality of stamp contexts; the saved information including said stamp position;

jumping to another stampline in the one tile and repeating the moving, saving, and jumping steps until all pixels that are in an intersection of the graphic object and the tile have been traversed; and restoring from a stamp context of the plurality of stamp contexts the saved stamp position so as to position the stamp in another tile, and repeating the moving, saving, jumping and restoring steps until all pixels of the graphic object have been traversed.

2. The method of claim 1 wherein the plurality of stamp contexts include a first stamp context for storing a stamp position adjacent to a current stamp position, and a second stamp context for storing a stamp position that is adjacent to the current stamp position and in a tile adjacent to the current tile.

3. The method of claim 1 wherein the plurality of stamp contexts include a first stamp context for storing a stamp position adjacent to a current stamp position in a direction perpendicular to a direction of movement of the stamp along a stampline, and a second stamp context for storing a stamp position in an adjacent tile in the same direction as the direction of movement of the stamp along a stampline.

4. The method of claim 1 wherein the plurality of stamp contexts include a first stamp context for storing a stamp position adjacent to a current stamp position in a direction perpendicular to a direction of movement of the stamp along a stampline, a second stamp context for storing a stamp position adjacent to the current stamp position in the opposite direction from the first stamp context, and a third stamp context for storing a stamp position in an adjacent tile in the same direction as the direction of movement of the stamp along a stampline.

5. The method of claim 1 wherein the stamp moves vertically along column stamplines before moving to the next stampline.

6. The method of claim 1 wherein the stamp moves horizontally along row stamplines before moving to the next stampline.

7. The method of claim 1 wherein the graphic object includes a plurality of vertices and the method includes:

determining a minimal rectangular bounding box for the graphic object; and selecting a starting vertex from the plurality of vertices, the starting vertex lying on a side of the minimal rectangular bounding box, and positioning the stamp to a pixel position such that the stamp contains the starting vertex prior to performing the first moving step.

8. The method of claim 7 wherein the starting vertex is positioned on a corner of the minimal rectangular bounding box.

9. The method of claim 1 including evaluating a plurality of edge functions at each of a plurality of points whose positions are determined relative to a current stamp position to produce a corresponding set of edge function results, and using said edge function results to determine when to perform the move, save, jump, and restore steps.

10. The method of claim 1, wherein the tile includes left, right, top and bottom boundaries;

the method including determining whether the current stamp position is at one or more of the left, right, top, and bottom boundaries of the tile.

11. The method of claim 1 wherein:

information associated with the pixels is stored in a frame buffer memory;

the frame buffer memory includes a frame buffer cache having frame buffer cache lines;

each frame buffer cache line is capable of storing information associated with a plurality of the pixels; and all the information capable of being stored in each frame buffer cache line corresponds to pixels located in only one of the tiles.

12. The method of claim 1 wherein:

information associated with the pixels is stored in a frame buffer memory;

the frame buffer memory is partitioned into a plurality of frame buffer segments;

each frame buffer segment includes a frame buffer cache having frame buffer cache lines;

each frame buffer cache line is capable of storing information associated with a plurality of the pixels; and the tile includes at most one cache line from each of the plurality of frame buffer segments.

13. The method of claim 12 wherein each tile comprises a set of pixels comprising all pixels stored in a single respective cache line of each of the frame buffer segments.

14. The method of claim 1 wherein:

texture information to be applied to pixel fragments is stored in a texture map memory;

the texture map memory includes a texture map cache capable of storing texture map information associated with a plurality of the pixels, the texture map cache having an associated storage capacity; and the texture information associated with the pixels located in any one of the tiles having a storage size that is not larger than twice the capacity of the texture map cache.

15. The method of claim 1 wherein:

texture information to be applied to pixel fragments is stored in a texture map memory; and the stamp moves horizontally from tile to tile within row tilelines and the tiles have an associated width that is equal to a width associated with the stamp.

16. The method of claim 1 wherein:

texture information to be applied to pixel fragments is stored in a texture map memory; and the stamp moves vertically from tile to tile within column tilelines and the tile have an associated height that is equal to a height associated with the stamp.

17. The method of claim 1 wherein a sliver position of the stamp is a stamp position where an intersection of the stamp and the object does not include any sample points of the stamp and the position may potentially be avoided;

each stamp context of a plurality of the stamp contexts includes a sliver bit indicating whether the saved position stored in the stamp context has been determined to be a sliver position; and the restoring step includes preferentially selecting a stamp context having a silver bit that indicates that the saved position stored therein has not been determined to be a sliver position over another stamp context having a silver bit that indicates that the saved position stored therein has been determined to be a sliver position.

18. The method of claim 17, including bypassing the saving and restoring steps, when predefined bypass criteria are satisfied, and moving directly to the stamp position that would have been saved into a corresponding stamp context of the plurality of stamp contexts.

19. The method of claim 18, including at a current stamp position of the stamp, computing for a plurality of sparse contexts information associated with a plurality of stamp positions neighboring the current stamp position;

the information computed for each sparse context includes a valid bit, wherein a first value of the valid bit indicates whether the stamp position associated with the sparse context potentially contains a portion of the object and is therefore a valid position, and a second value of the valid bit indicates that the corresponding stamp position does not contain a portion of the object and is therefore an invalid position;

wherein said moving step includes determining a next stamp position in accordance with the information computed for the plurality of sparse contexts; and said saving step uses information from at least one of the sparse contexts.

20. The method of claim 19, wherein the information associated with each of a plurality of contexts includes a sliver bit, wherein a first value of the sliver bit indicates whether the stamp position associated with the context has been determined to be a sliver position that may potentially be avoided, and a second value of the sliver bit indicates that the stamp position associated with the context has not been determined to be a sliver position; and the method includes invalidating a particular one of the stamp contexts that contains a sliver bit set to the first value when another particular one of the stamp contexts contains a valid bit set to the first value of the valid bit.

21. The method of claim 19, wherein the bypassing and moving directly step includes selecting and saving one of the plurality of sparse contexts into a current context.

22. The method of claim 19 wherein the plurality of sparse contexts includes a forward sparse context denoting a stamp position immediately adjacent to the current stamp position in a direction of movement of the stamp along a stampline, an over sparse context denoting a stamp position immediately adjacent to the current stamp position and perpendicular to the direction of movement of the stamp along a stampline, and a back sparse context denoting a stamp position immediately adjacent to the current stamp position in the opposite direction from the forward sparse context.

23. The method of claim 22, wherein the stamp contexts include a current context, a back save stamp context, a forward save stamp context, over save context, back tile save stamp context, forward tile save stamp context and over tile save context;

the method including:

using tilelines parallel to the stamplines;

upon placing the stamp in a new stampline, saving the back sparse context into the back save stamp context when the back sparse context is valid and denotes a stamp position within a current tile;

when the stamp is within a first tile of a tileline, saving the back sparse context into the back tile save context if the back sparse context is valid and denotes a position in a tile adjacent to the current tile;

when the stamp is moving in a back direction from tile to tile within a tileline, saving the back sparse context into the back tile save context if the back sparse context is valid and denotes a position in a tile adjacent to the current tile;

saving the over sparse context into the over save context if the over sparse context is valid and denotes a position within the current tile;

saving the over sparse context into the over tile save context if the over sparse context is valid and denotes a position in a tile adjacent to the current tile;

when moving in a forward direction from tile to tile within a tileline, saving the forward sparse context into the forward tile save context if the forward sparse context is valid and denotes a position in a tile adjacent to the current tile;

traversing a current stampline by moving to the stamp position denoted by the forward sparse context as long as the forward sparse context is valid and within the current tile, then restoring the back save context if valid to the current context and moving to the stamp position denoted by the back sparse context as long as the back sparse context is valid and within the current tile;

traversing the current tile by moving to a new stampline by restoring the over save context if valid to the current context, then repeating the traversing the current stampline and moving to a new stampline operations until all portions of the object within the tile have been visited;

traversing the current tileline by moving to a new tile in the tileline in the forward direction by restoring the forward tile save context if valid to the current context, traversing the new tile, and repeating until all tiles in the tileline in the forward direction that contain a portion of the object have been visited, then moving to a new tile in the tileline in the back direction by restoring the back tile save context if valid to the current context, traversing the new tile, and repeating until all tiles in the tileline in the back direction that contain a portion of the object have been visited;

traversing the entire object by moving to a new tile in a new tileline in an over direction by restoring the over tile save context if valid to the current context, then repeating until all tilelines that contain a portion of the object have been visited.

24. The method of claim 23 wherein the back sparse context is not saved into the back tile save context, but is instead saved into and restored from the over save context when the over sparse context stamp position is in a tile adjacent to the current tile, and is saved into and restored from the over tile save context when the over sparse context is in the current tile.

25. The method of claim 19 wherein the plurality of sparse contexts includes a forward sparse context denoting a stamp position immediately adjacent to the current stamp position and perpendicular to a direction of movement of the stamp along a stampline, an over sparse context denoting a stamp position immediately adjacent to the current stamp position in the direction of movement of the stamp along a stampline, and a back sparse context denoting a stamp position immediately adjacent to the current stamp position in the opposite direction from the forward sparse context.

26. The method of claim 25 wherein the stamp contexts include a current context, a back save stamp context, a forward save stamp context, an over save context, and an over tile save context;

the method including:

using tilelines perpendicular to the stamplines;

saving the forward sparse context into a forward save context if the forward context is valid and movement from stampline to stampline is in a forward direction;

saving the back sparse context into a back save context if the back sparse context is valid and the stamp is on the first stampline or if movement from stampline to stampline is in a back direction;

saving the over sparse context into an over tile save context if the over sparse context is valid and denotes a stamp position in a tile adjacent to the current tile;

traversing a stampline in the graphic object by moving to the stamp position denoted by the over sparse context as long as the over sparse context is valid and denotes a stamp position within the current tile;

traversing portions of the graphic object, if any, in the first tile in the tileline in the forward direction by restoring the forward save context if the forward save context is valid and denotes a stamp position in the current tile, and repeating the stampline traversing and restoring the forward save context steps;

traversing portions of the graphic object, if any, in the tileline in the back direction by restoring the back save context if valid and repeating the stampline traversing and restoring the back save context steps;

traversing portions of the graphic object in the tiles, if any, below the first tile in the tileline in the forward direction by restoring the forward save context if valid and repeating the stampline traversing and restoring the forward save context steps; and restoring the over save context if valid and repeating the traversing steps.

27. The method of claim 25 wherein the stamp contexts include a current context, a back save stamp context, a forward save stamp context, an over save context, and an over tile save context;

the method including:

using tilelines perpendicular to the stamplines;

saving the forward sparse context into a forward save context if the forward context is valid and movement from stampline to stampline is in a forward direction;

saving the back sparse context into a back save context if the back sparse context is valid and the stamp is on the first stampline or if movement from stampline to stampline is in a back direction;

saving the over sparse context into an over tile save context if the over sparse context is valid and denotes a stamp position in a tile adjacent to the current tile;

traversing a stampline in the graphic object by moving to the stamp position denoted by the over sparse context as long as the over sparse context is valid and denotes a stamp position within the current tile;

traversing portions of the graphic object, if any, in the tileline in the forward direction by restoring the forward save context if the forward save context is valid and repeating the stampline traversing and restoring the forward save context steps;

traversing portions of the graphic object, if any, in the tileline in the back direction by restoring the back save context if valid and repeating the stampline traversing and restoring the back save context steps;

restoring the over save context if valid and repeating the traversing steps.

28. The method of claim 1 wherein information associated with the pixels is stored in a frame buffer memory; and the moving from stampline to stampline, and the saving and restoring of stamp contexts are ordered for efficient access to the frame buffer memory.

29. The method of claim 28 wherein a serpentine traversal pattern determines an order in which the tiles are to be traversed.

30. The method of claim 28 wherein
tiles are partitioned into two or more disjoint sets;
one or more of the stamp contexts that are associated with positions outside the current tile are sub-divided into first and second stamp contexts;
the sparse contexts are saved into the first and second stamp contexts such that if both of the two stamp contexts are valid, the first stamp context contains a stamp position in a tile that is in a different set from a tile containing the stamp position denoted by the second stamp context; and
the restoring step includes selecting a valid stamp context from the first and second stamp contexts, and if both first and second stamp contexts are valid, selecting a context from the first and second stamp contexts that denotes a stamp position in a tile that is in a different set from the current tile; the restoring step further including invalidating both the first and second stamp contexts.

31. The method of claim 1 further comprising:
overlaying the tiles with metatiles, each metatile encompassing a plurality of the tiles;
saving a metatile stamp context identifying a next metatile to process;
moving the stamp so as to visit all tiles that contain a portion of the object within a current metatile; and
restoring the metatile stamp context identifying the next metatile to be processed when all tiles that contain a portion of the object in the current metatile have been visited, the metatile stamp context restoring including invalidating the metatile stamp context, and repeating the metatile stamp context saving, moving and metatile stamp restoring steps until the metatile stamp context is invalid.

32. The method of claim 1 further comprising:
dividing the array of pixels into an array of metatiles, wherein at least one tile of the plurality of tiles is partially enclosed in each of a plurality of the metatiles;
saving a metatile stamp context identifying a next metatile to process;
moving the stamp so as to visit a portion of all tiles that contain a portion of the object and that are within a current metatile; and
restoring the metatile stamp context identifying the next metatile to be processed when all portions of the tiles that contain a portion of the object in the current metatile have been visited, the metatile stamp context restoring including invalidating the metatile stamp context, and repeating the metatile stamp context saving, moving and metatile stamp restoring steps until the metatile stamp context is invalid.

33. A graphics processor for rendering an image including a graphic object, the graphic object being defined with respect to an array of pixels that is divided into an array of rectangular tiles, comprising:
a frame buffer memory for storing information associated with the pixels;
graphics circuitry for rendering the graphic object at pixels in a stamp, comprising a rectangular stamp region of predefined size at a current stamp position within the array of pixels;
stamp control logic for setting the current stamp position to a sequence of stamp positions, and enabling the graphics circuitry to render the graphic object at each current stamp position in the sequence so as to render the graphic object at all pixels in the array of pixels that have at least one sample point in the graphic object, the stamp positioning logic configured to set the current stamp position by:
moving the stamp along on a stampline, within one of the tiles, until a boundary of the tile or a boundary of the graphic object is reached;
saving information associated with a stamp position that is in an adjacent tile, if any, into a corresponding stamp context of a plurality of stamp contexts; the saved information including said stamp position;
jumping to another stampline in the one tile and repeating the moving, saving, and jumping operations until all pixels that are in an intersection of the graphic object and the tile have been traversed; and
restoring from a stamp context of the plurality of stamp contexts the saved stamp position so as to position the stamp in another tile, and repeating the moving, saving, jumping and restoring operations until all pixels of the graphic object have been traversed.

34. The graphics processor of claim 33 wherein the plurality of stamp contexts include a first stamp context for storing a stamp position adjacent to a current stamp position, and a second stamp context for storing a stamp position that is adjacent to the current stamp position and in a tile adjacent to the current tile.

35. The graphics processor of claim 33 wherein the plurality of stamp contexts include a first stamp context for storing a stamp position adjacent to a current stamp position in a direction perpendicular to a direction of movement of the stamp along a stampline, and a second stamp context for storing a stamp position in an adjacent tile in the same direction as the direction of movement of the stamp along a stampline.

36. The graphics processor of claim 33 wherein the plurality of stamp contexts include a first stamp context for storing a stamp position adjacent to a current stamp position in a direction perpendicular to a direction of movement of the stamp along a stampline, a second stamp context for storing a stamp position adjacent to the current stamp position in the opposite direction from the first stamp context, and a third stamp context for storing a stamp position in an adjacent tile in the same direction as the direction of movement of the stamp along a stampline.

37. The graphics processor of claim 33 wherein the stamp moves vertically along column stamplines before moving to the next stampline.

38. The graphics processor of claim 33 wherein the stamp moves horizontally along row stamplines before moving to the next stampline.

39. The graphics processor of claim 33 wherein the graphic object includes a plurality of vertices and the stamp positioning logic is further configured to set the current stamp position by:
determining a minimal rectangular bounding box for the graphic object; and
selecting a starting vertex from the plurality of vertices, the starting vertex lying on a side of the minimal rectangular bounding box, and positioning the stamp to a pixel position such that the stamp contains the starting vertex prior to performing the first moving operation.

40. The graphics processor of claim 39 wherein the starting vertex is positioned on a corner of the minimal rectangular bounding box.

41. The graphics processor of claim 33 including evaluating an edge function at each of a plurality of points whose positions are determined relative to a current stamp position to produce a corresponding set of edge function results, and using said edge function results to determine when to perform the move, save, jump, and restore operations.

42. The graphics processor of claim 33, wherein
the tile includes left, right, top and bottom boundaries; and
the stamp positioning logic is further configured to set the current stamp position by:
determining whether the current stamp position is at one or more of the left, right, top, and bottom boundaries of the tile.

43. The graphics processor of claim 33 wherein:
the frame buffer memory includes a frame buffer cache having frame buffer cache lines;
each frame buffer cache line is capable of storing information associated a plurality of the pixels; and
all the information capable of being stored in each frame buffer cache line corresponds to pixels located in only one of the tiles.

44. The graphics processor of claim 33 wherein:
information associated with the pixels is stored in a frame buffer memory;
the frame buffer memory is partitioned into a plurality of frame buffer segments;
each frame buffer segment includes a frame buffer cache having frame buffer cache lines;
each frame buffer cache line is capable of storing information associated with a plurality of the pixels; and
the tile includes at most one cache line from each of the plurality of frame buffer segments.

45. The graphics processor of claim 44 wherein each tile comprises a set of pixels comprising all pixels stored in a single respective cache line of each of the frame buffer segments.

46. The graphics processor of claim 33 wherein:
texture information to be applied to pixel fragments is stored in a texture map memory;
the texture map memory includes a texture map cache capable of storing texture map information associated with a plurality of the pixels, the texture map cache having an associated storage capacity; and
the texture information associated with the pixels located in any one of the tiles having a storage size that is not larger than twice the capacity of the texture map cache.

47. The graphics processor of claim 33 wherein:
texture information to be applied to pixel fragments is stored in a texture map memory; and
the stamp positioning logic is further configured to set the current stamp position so as to move the stamp horizontally from tile to tile within row tilelines, and the tiles have an associated width that is equal to a width associated with the stamp.

48. The graphics processor of claim 33 wherein:
texture information to be applied to pixel fragments is stored in a texture map memory; and
the stamp positioning logic is further configured to set the current stamp position so as to move the stamp vertically from tile to tile within column tilelines and the tile have an associated height that is equal to a height associated with the stamp.

49. The graphics processor of claim 33 wherein
a sliver position of the stamp is a stamp position where an intersection of the stamp and the object does not include any sample points of the stamp and the position may potentially be avoided;
each stamp context of a plurality of the stamp contexts includes a sliver bit indicating whether the saved position stored in the stamp context has been determined to be a sliver position; and
the restoring operation includes preferentially selecting a stamp context whose silver bit indicates that the saved position stored therein has not been determined to be a sliver position over another stamp context whose silver bit indicates that the saved position stored therein has been determined to be a sliver position.

50. The graphics processor of claim 49, including
bypassing the saving and restoring operations, when predefined bypass criteria are satisfied, and moving directly to the stamp position that would have been saved into a corresponding stamp context of the plurality of stamp contexts.

51. The graphics processor of claim 50, including
at a current stamp position of the stamp, computing for a plurality of sparse contexts information associated with a plurality of stamp positions neighboring the current stamp position;
the information computed for each sparse context includes a valid bit, wherein a first value of the valid bit indicates whether the stamp position associated with the sparse context potentially contains a portion of the object and is therefore a valid position, and a second value of the valid bit indicates that the corresponding stamp position does not contain a portion of the object and is therefore an invalid position;
wherein
said moving operation includes determining a next stamp position in accordance with the information computed for the plurality of sparse contexts; and
said saving operation uses information from at least one of the sparse contexts.

52. The graphics processor of claim 51, wherein
the information associated with each of a plurality of contexts includes a sliver bit, wherein a first value of the sliver bit indicates whether the stamp position associated with the context has been determined to be a sliver position that may potentially be avoided, and a second value of the sliver bit indicates that the stamp position associated with the context has not been determined to be a sliver position; and
the stamp positioning logic is further configured to set the current stamp position by:
invalidating a particular one of the stamp contexts that contains a sliver bit set to the first value when a particular one of the contexts contains a valid bit set to the first value of the valid bit.

53. The graphics processor of claim 51, wherein the bypassing and moving directly operation includes selecting and saving one of the plurality of sparse contexts into a current context.

54. The graphics processor of claim 51 wherein the plurality of sparse contexts includes a forward sparse context denoting a stamp position immediately adjacent to the current stamp position in a direction of movement of the stamp along a stampline, an over sparse context denoting a stamp position immediately adjacent to the current stamp position and perpendicular to the direction of movement of the stamp along a stampline, and a back sparse context denoting a stamp position immediately adjacent to the current stamp position in the opposite direction from the forward sparse context.

55. The graphics processor of claim 54, wherein
the stamp contexts include a current context, a back save stamp context, a forward save stamp context, over save context, back tile save stamp context, forward tile save stamp context and over tile save context;
the stamp positioning logic is further configured to set the current stamp position by:
using tilelines parallel to the stamplines;
upon placing the stamp in a new stampline, saving the back sparse context into the back save stamp context when the back sparse context is valid and denotes a stamp position within a current tile;
when the stamp is within a first tile of a tileline, saving the back sparse context into the back tile save context if the back sparse context is valid and denotes a position in a tile adjacent to the current tile;
when the stamp is moving in a back direction from tile to tile within a tileline, saving the back sparse context into the back tile save context if the back sparse context is valid and denotes a position in a tile adjacent to the current tile;
saving the over sparse context into the over save context if the over sparse context is valid and denotes a position within the current tile;
saving the over sparse context into the over tile save context if the over sparse context is valid and denotes a position in a tile adjacent to the current tile;
when moving in a forward direction from tile to tile within a tileline, saving the forward sparse context into the forward tile save context if the forward sparse context is valid and denotes a position in a tile adjacent to the current tile;
traversing a current stampline by moving to the stamp position denoted by the forward sparse context as long as the forward sparse context is valid and within the current tile, then restoring the back save context if valid to the current context and moving to the stamp position denoted by the back sparse context as long as the back sparse context is valid and within the current tile;
traversing the current tile by moving to a new stampline by restoring the over save context if valid to the current context, then repeating the traversing the current stampline and moving to a new stampline operations until all portions of the object within the tile have been visited;
traversing the current tileline by moving to a new tile in the tileline in the forward direction by restoring the forward tile save context if valid to the current context, traversing the new tile, and repeating until all tiles in the tileline in the forward direction that contain a portion of the object have been visited, then moving to a new tile in the tileline in the back direction by restoring the back tile save context if valid to the current context, traversing the new tile, and repeating until all tiles in the tileline in the back direction that contain a portion of the object have been visited;
traversing the entire object by moving to a new tile in a new tileline in an over direction by restoring the over tile save context if valid to the current context, then repeating until all tilelines that contain a portion of the object have been visited.

56. The graphics processor of claim 51 wherein the back sparse context is not saved into the back tile save context, but is instead saved into and restored from the over save context when the over sparse context stamp position is in a tile adjacent to the current tile, and is saved into and restored from the over tile save context when the over sparse context is in the current tile.

57. The graphics processor of claim 51 wherein the plurality of sparse contexts includes a forward sparse context denoting a stamp position immediately adjacent to the current stamp position and perpendicular to a direction of movement of the stamp along a stampline, an over sparse context denoting a stamp position immediately adjacent to the current stamp position in the direction of movement of the stamp along a stampline, and a back sparse context denoting a stamp position immediately adjacent to the current stamp position in the opposite direction from the forward sparse context.

58. The graphics processor of claim 57 wherein
the stamp contexts include a current context, a back save stamp context, a forward save stamp context, over save context, and over tile save context;
the stamp positioning logic is further configured to set the current stamp position by:
using tilelines perpendicular to the stamplines;
saving the forward sparse context into a forward save context if the forward context is valid and movement from stampline to stampline is in a forward direction;
saving the back sparse context into a back save context if the back sparse context is valid and the stamp is on the first stampline or if movement from stampline to stampline is in a back direction;
saving the over sparse context into an over tile save context if the over sparse context is valid and denotes a stamp position in a tile adjacent to the current tile;
traversing a stampline in the graphic object by moving to the stamp position denoted by the over sparse context as long as the over sparse context is valid and denotes a stamp position within the current tile;
traversing portions of the graphic object, if any, in the first tile in the tileline in the forward direction by restoring the forward save context if the forward save context is valid and denotes a stamp position in the current tile, and repeating the stampline traversing and restoring the forward save context operations;
traversing portions of the graphic object, if any, in the tileline in the back direction by restoring the back save context if valid and repeating the stampline traversing and restoring the back save context operations;
traversing portions of the graphic object in the tiles, if any, below the first tile in the tileline in the forward direction by restoring the forward save context if valid and repeating the stampline traversing and restoring the forward save context operations; and
restoring the over save context if valid and repeating the traversing operations.

59. The graphics processor of claim 57 wherein
the stamp contexts include a current context, a back save stamp context, a forward save stamp context, over save context, and over tile save context;
the stamp positioning logic is further configured to set the current stamp position by:
using tilelines perpendicular to the stamplines;
saving the forward sparse context into a forward save context if the forward context is valid and movement from stampline to stampline is in a forward direction;
saving the back sparse context into a back save context if the back sparse context is valid and the stamp is on the first stampline or if movement from stampline to stampline is in a back direction;

saving the over sparse context into an over tile save context if the over sparse context is valid and denotes a stamp position in a tile adjacent to the current tile;

traversing a stampline in the graphic object by moving to the stamp position denoted by the over sparse context as long as the over sparse context is valid and denotes a stamp position within the current tile;

traversing portions of the graphic object, if any, in the tileline in the forward direction by restoring the forward save context if the forward save context is valid and repeating the stampline traversing and restoring the forward save context operations;

traversing portions of the graphic object, if any, in the tileline in the back direction by restoring the back save context if valid and repeating the stampline traversing and restoring the back save context operations;

restoring the over save context if valid and repeating the traversing operations.

60. The graphics processor of claim 55 wherein information associated with the pixels is stored in a frame buffer memory; and the operations of moving from stampline to stampline, and the saving and restoring of stamp contexts are ordered for efficient access to the frame buffer memory.

61. The graphics processor of claim 60 wherein a serpentine traversal pattern determines an order in which the tiles are to be traversed.

62. The graphics processor of claim 60 wherein tiles are partitioned into two or more disjoint sets;

one or more of the stamp contexts that are associated with positions outside the current tile are sub-divided into first and second stamp contexts;

the sparse contexts are saved into the first and second stamp contexts such that if both of the two stamp contexts are valid, the first stamp context contains a stamp position in a tile that is in a different set from a tile containing the stamp position denoted by the second stamp context; and the restoring operation includes selecting a valid stamp context from the first and second stamp contexts, and if both first and second stamp contexts are valid, selecting a context from the first and second stamp contexts that denotes a stamp position in a tile that is in a different set from the current tile; the restoring operation further including invalidating both the first and second stamp contexts.

63. The graphics processor of claim 33 wherein the stamp positioning logic is further configured to set the current stamp position by:

overlaying the tiles with metatiles, each metatile encompassing a plurality of the tiles;

saving a metatile stamp context identifying a next metatile to process;

moving the stamp so as to visit all tiles that contain a portion of the object within a current metatile; and restoring the metatile stamp context identifying the next metatile to be processed when all tiles that contain a portion of the object in the current metatile have been visited, the metatile stamp context restoring including invalidating the metatile stamp context, and repeating the metatile stamp context saving, moving and metatile stamp restoring operations until the metatile stamp context is invalid.

64. The graphics processor of claim 33 wherein the stamp positioning logic is further configured to set the current stamp position by:

dividing the array of pixels into an array of metatiles, wherein at least one tile of the plurality of tiles is partially enclosed in each of a plurality of the metatiles;

saving a metatile stamp context identifying a next metatile to process;

moving the stamp so as to visit a portion of all tiles that contain a portion of the object and that are within a current metatile; and restoring the metatile stamp context identifying the next metatile to be processed when all portions of the tiles that contain a portion of the object in the current metatile have been visited, the metatile stamp context restoring including invalidating the metatile stamp context, and repeating the metatile stamp context saving, moving and metatile stamp restoring operations until the metatile stamp context is invalid.

* * * * *